United States Patent
Watanabe

(10) Patent No.: US 7,548,924 B2
(45) Date of Patent: *Jun. 16, 2009

(54) MANAGING METHOD FOR STORAGE SUBSYSTEM

(75) Inventor: Naoki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 158 days.

This patent is subject to a terminal disclaimer.

(21) Appl. No.: 10/873,271

(22) Filed: Jun. 23, 2004

(65) Prior Publication Data

US 2005/0234941 A1 Oct. 20, 2005

(30) Foreign Application Priority Data

Apr. 20, 2004 (JP) ............................ 2004-124385

(51) Int. Cl.
*G06F 7/00* (2006.01)
*G06F 17/00* (2006.01)

(52) U.S. Cl. .................... 707/100; 711/112; 709/223

(58) Field of Classification Search ............. 707/1–10, 707/100–104.1, 200–205; 717/114–115; 711/112

See application file for complete search history.

(56) References Cited

U.S. PATENT DOCUMENTS

| 6,151,331 | A * | 11/2000 | Wilson ................. 370/465 |
| 6,199,112 | B1 * | 3/2001 | Wilson ................. 709/227 |
| 6,640,278 | B1 * | 10/2003 | Nolan et al. ............. 711/6 |
| 6,745,281 | B1 * | 6/2004 | Saegusa ................ 711/112 |
| 6,795,434 | B1 * | 9/2004 | Kumar et al. ............ 370/392 |
| 6,856,597 | B1 * | 2/2005 | Scott .................. 370/234 |
| 6,892,264 | B2 * | 5/2005 | Lamb .................. 710/201 |
| 7,194,538 | B1 * | 3/2007 | Rabe et al. ............. 709/224 |
| 7,222,176 | B1 * | 5/2007 | Laurent et al. .......... 709/226 |
| 2002/0087724 | A1 | 7/2002 | Datta |
| 2003/0212711 | A1 * | 11/2003 | Fujibayashi et al. ...... 707/200 |
| 2003/0221063 | A1 * | 11/2003 | Eguchi et al. ........... 711/114 |
| 2003/0229689 | A1 * | 12/2003 | Raghavan et al. ......... 709/223 |
| 2003/0233518 | A1 * | 12/2003 | Yamagami et al. ........ 711/114 |
| 2004/0008702 | A1 * | 1/2004 | Someya et al. .......... 370/401 |
| 2004/0064543 | A1 * | 4/2004 | Ashutosh et al. ......... 709/224 |
| 2004/0088417 | A1 | 5/2004 | Bober et al. |
| 2005/0044141 | A1 * | 2/2005 | Hameleers et al. ........ 709/204 |

(Continued)

OTHER PUBLICATIONS

"EMC Power Path—*Enterprise Storage Software*," Product Description Guide, pp. 1-25.

(Continued)

*Primary Examiner*—Hosain T Alam
*Assistant Examiner*—Shew-Fen Lin
(74) *Attorney, Agent, or Firm*—Brundidge & Stanger, P.C.

(57) ABSTRACT

A management computer, which allocates ports to an information processing system, including a host computer and a storage subsystem, operates to group plural ports, plural logic devices, and the host computers for each storage domain that constitutes a management unit. In the case in which a discovery request for the logic devices is received from a host computer, a storage domain to which the host computer, which has sent the discovery request, and the logic devices, for which the discovery is requested, are specified out of the storage domains in which the plural ports, the plural logic devices, and the host computers are grouped. Then, the ports, which belong to the specified storage domain, are selected, and the selected ports are allocated to the logic devices.

12 Claims, 23 Drawing Sheets

U.S. PATENT DOCUMENTS

2005/0060413 A1    3/2005    Oyadomari et al.
2005/0066020 A1    3/2005    Wechter et al.
2005/0080881 A1    4/2005    Voorhees et al.
2005/0210321 A1*    9/2005    Bai et al. .................... 714/13

OTHER PUBLICATIONS

J. Tseng et al., McData Corporation, Franco Travostino Nortel Networks Curt Du Laney Joe Souza Microsoft: "Internet Storage Name Service (iSNS); draft-letf-ips-isns-22.txt", IETF Standard-Working-Draft, Internet Engineering Task Force, IETF, CH, vol. ips, No. 22, Feb. 2004, XP015038419.

International Business Machines Corporation: "Use of DNS aliases to configure fault tolerance" Research Disclosure, Mason Publications, Hampshire, GB, vol. 442, No. 106, Feb. 2001, XP007127665.

Savill, "How can I enable or disable subnet prioritization on the DNS server" [Online], Oct. 2002, XP002496188.

* cited by examiner

FIG. 4

STORAGE DOMAIN MANAGEMENT TABLE 113

| STORAGE DOMAIN ID | STORAGE DOMAIN NAME | ATTRIBUTE |
|---|---|---|
| sa | Account | ACCOUNTING |
| sb | Develop | DEVELOPMENT |

PORT MANAGEMENT TABLE 112

| APPARATUS ID | PORT ID | ADDRESS | PORT UTILIZATION RATE | STATE | STORAGE DOMAIN ID |
|---|---|---|---|---|---|
| STORAGE A | A | A1 | 90% | OVERLOAD | sa |
| | B | A2 | 20% | NORMAL | sb |
| | C | A3 | — | OFFLINE | |
| | D | A4 | — | BLOCKED | |

DEVICE MANAGEMENT TABLE 111

| APPARATUS ID (601) | DEVICE ID (602) | PROTOCOL (603) | SIZE (604) | AUTHENTICATION INFORMATION (605) | STATE (606) | STORAGE DOMAIN ID (607) |
|---|---|---|---|---|---|---|
| STORAGE A | DevA | iSCSI | 10GB | AUTHENTICATION A | USED | sa |
| | DevB | iSCSI | 10GB | AUTHENTICATION B | NOT USED | sa |
| | DevC | iSCSI | 10GB | AUTHENTICATION C | NOT USED | sb |

FIG. 7

HOST MANAGEMENT TABLE 116

| APPARATUS ID (701) | PORT ID (702) | ADDRESS (703) | PROTOCOL (704) | STATE (705) | STORAGE DOMAIN ID (706) |
|---|---|---|---|---|---|
| HOST A | A1 | HA1 | iSCSI | NORMAL | sa |
| | A2 | HA2 | iSCSI | NORMAL | sa |
| HOST B | B1 | HB1 | iSCSI | NORMAL | sb |
| HOST C | C1 | HC1 | iSCSI | NORMAL | sb |

FIG. 8

NAME MANAGEMENT TABLE 115

| EID 801 | iSCSI NAME 802 | DD 803 | NODE TYPE 804 | PORTAL GROUP 805 | PORTAL IP ADDRESS : PORT 806 |
|---|---|---|---|---|---|
| 6 | hostA | 1 | INITIATOR | — | 192.168.1.10 : 1001 |
| 7 | hostB | 2 | INITIATOR | — | 192.168.1.11 : 1001 |
| 8 | hostB | 2 | INITIATOR | — | 192.168.1.11 : 1001 |
| 1 | DevA | 1 | TARGET | SA1 | 192.168.1.1 : 1001 |
|   |      |   |        | SA2 | 192.168.1.2 : 1001 |
| 2 | DevB | 1 | TARGET | SB1 | 192.168.1.1 : 1001 |
|   |      |   |        | SB2 | 192.168.1.2 : 1001 |
| 3 | DevC | 1 | TARGET |     | 192.168.1.3 : 1001 |
| 4 | hostA | 1 | INITIATOR | HA1 | 192.168.1.10 : 1001 |
| 5 | hostB | 2 | INITIATOR | HB1 | 192.168.1.11 : 1001 |

FIG. 17

SAN DOMAIN MANAGEMENT TABLE 1503

| SAN DOMAIN ID 1701 | SAN DOMAIN NAME 1702 | ATTRIBUTE 1703 |
|---|---|---|
| na | SAN DOMAIN A | VLAN-A |
| naa | SAN DOMAIN AA | SUB-LAN-AA |
| nab | SAN DOMAIN AB | SUB-LAN-AB |
| nc | SAN DOMAIN C | VLAN-C |

FIG. 18

PORT MANAGEMENT TABLE 1504

| APPARATUS ID 501 | PORT ID 502 | ADDRESS 503 | PORT UTILIZATION RATE 504 | STATE 505 | STORAGE DOMAIN ID 506 | SAN DOMAIN ID 1801 |
|---|---|---|---|---|---|---|
| STORAGE A | A | A1 | 90% | OVERLOAD | sa | na,naa |
| | B | A2 | 20% | NORMAL | sa | na,nab |
| | C | A3 | — | OFFLINE | sb | nc |
| | D | A4 | — | BLOCKED | sb | nc |

FIG. 19

HOST MANAGEMENT TABLE 1505

| APPARATUS ID 701 | PORT ID 702 | ADDRESS 703 | PROTOCOL 704 | STATE 705 | STORAGE DOMAIN ID 706 | SAN DOMAIN ID 1901 |
|---|---|---|---|---|---|---|
| HOST A | A1 | HA1 | iSCSI | NORMAL | sa | na, naa |
| HOST A | A2 | HA2 | iSCSI | NORMAL | sa | na, nab |
| HOST B | B1 | HB1 | iSCSI | NORMAL | sb | nc |
| HOST C | C1 | HC1 | iSCSI | NORMAL | sb | nc |

MANAGING METHOD FOR STORAGE SUBSYSTEM

CROSS-REFERENCES TO RELATED APPLICATIONS

This application relates to and claims priority from Japanese Patent Application No. 2004-124385, filed on Apr. 20, 2004, the entire disclosure of which is incorporated herein by reference.

BACKGROUND OF THE INVENTION

The present invention relates to a storage subsystem, which stores the data of a computer system, and to an integrated system formed of the storage subsystem and the computer system. In particular, the present invention relates to a technique for load distribution and failure avoidance among interface ports in the case in which the storage subsystem includes plural interface ports.

As an example of a system that manages a large amount of electronic data, there is a storage subsystem represented by a disk array apparatus. In the storage subsystem, it is necessary to perform failure avoidance and load distribution processing in order to utilize the electronic data efficiently.

Conventionally, in an information processing system having a host computer and a storage subsystem, there is a known device program that performs load distribution and backward processing between the host computer and the storage subsystem (e.g., Power Path produced by EMC Corporation).

SUMMARY OF THE INVENTION

However, the typical large storage subsystem has a problem in that an administrator is required to set all combinations of logic devices and ports of the storage subsystem, and so management thereof is complicated. In spite of this, in the above-mentioned device program, integrated management in the storage subsystem is not specifically taken into account.

In addition, in the device program, in the case in which load distribution processing and failure avoidance processing are performed, it is necessary to install a device program, which performs load distribution processing and failure avoidance processing, on a host computer connected to the storage subsystem. However, the device program is designed so as to perform the load distribution processing and the failure avoidance processing in an upper layer of a layer, in which a general-purpose protocol is used, in accordance with a unique protocol.

Therefore, in the device program, a problem of compatibility between the host computer and the storage subsystem occurs. More specifically, in the case in which load distribution and failure avoidance processing for a storage subsystem, to which plural disk array apparatuses of different manufacturers are connected, are performed, it is necessary to install a device program for the storage subsystem for each of the manufacturers on a host computer.

In order to solve the above-mentioned problem, an aspect of the present invention is applied to a management computer that allocates ports to an information processing system including at least one host computer and at least one storage subsystem that is connected to the host computer via a network.

Here, the storage subsystem has plural logic devices and plural ports and is connected to the network via the plural ports. The management computer executes the step of receiving an input of data indicating one or more storage domains that are management units for the storage subsystem; the step of grouping the plural ports, the plural logic devices, and the host computers in the one or more storage domains; the step of, in the case in which a discovery request for the logic devices is received from the host computer, specifying a storage domain to which both the host computer, which has sent the discovery request, and the logic devices, for which the discovery is requested, belong out of the storage domains in which the plural ports, the plural logic devices, and the host computers are grouped; the step of selecting ports which belong to the specified storage domain, and allocating the selected ports to the logic devices; and the step of sending information on the allocated ports to the host computer.

BRIEF DESCRIPTION OF THE DRAWINGS

In the accompanying drawings:

FIG. 4 is a diagram showing the data structure of a storage domain management table 113;

FIG. 5 is a diagram showing the data structure of a port management table 112;

FIG. 6 is a diagram showing the data structure of a device management table 111;

FIG. 7 is a diagram showing the data structure of a host management table 116;

FIG. 8 is a diagram showing the data structure of a name management table 115;

FIG. 17 is a diagram showing the data structure of a SAN domain management table 1503;

FIG. 18 is a diagram showing the data structure of a port management table 1504;

FIG. 19 is a diagram showing the data structure of a host management table 1505;

DESCRIPTION OF THE PREFERRED EMBODIMENTS

First, a first embodiment of the present invention will be explained.

Figure 1:
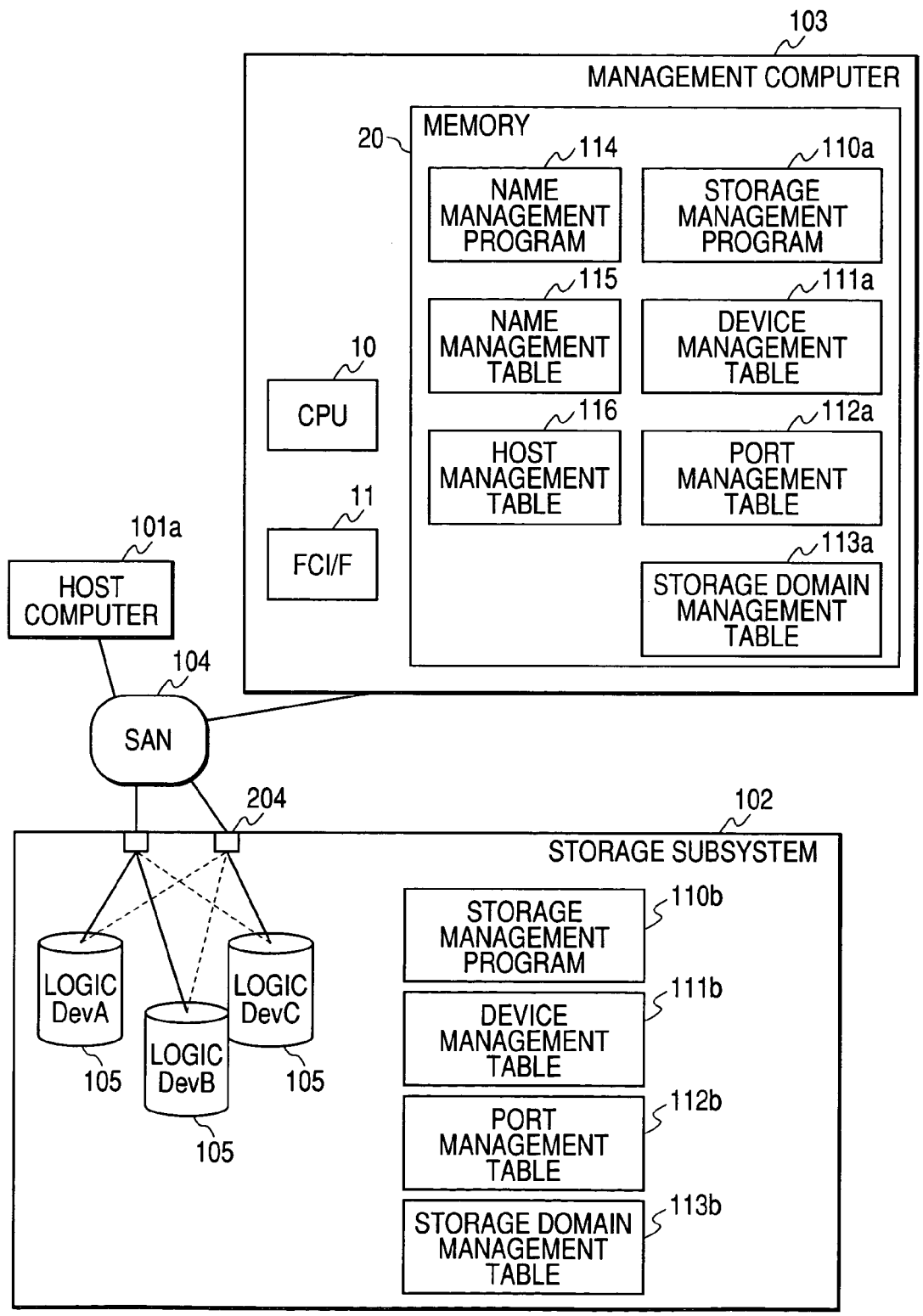
FIG. 1 is a block diagram showing an example of an information processing system according to a first embodiment of the present invention.
Figure 2:
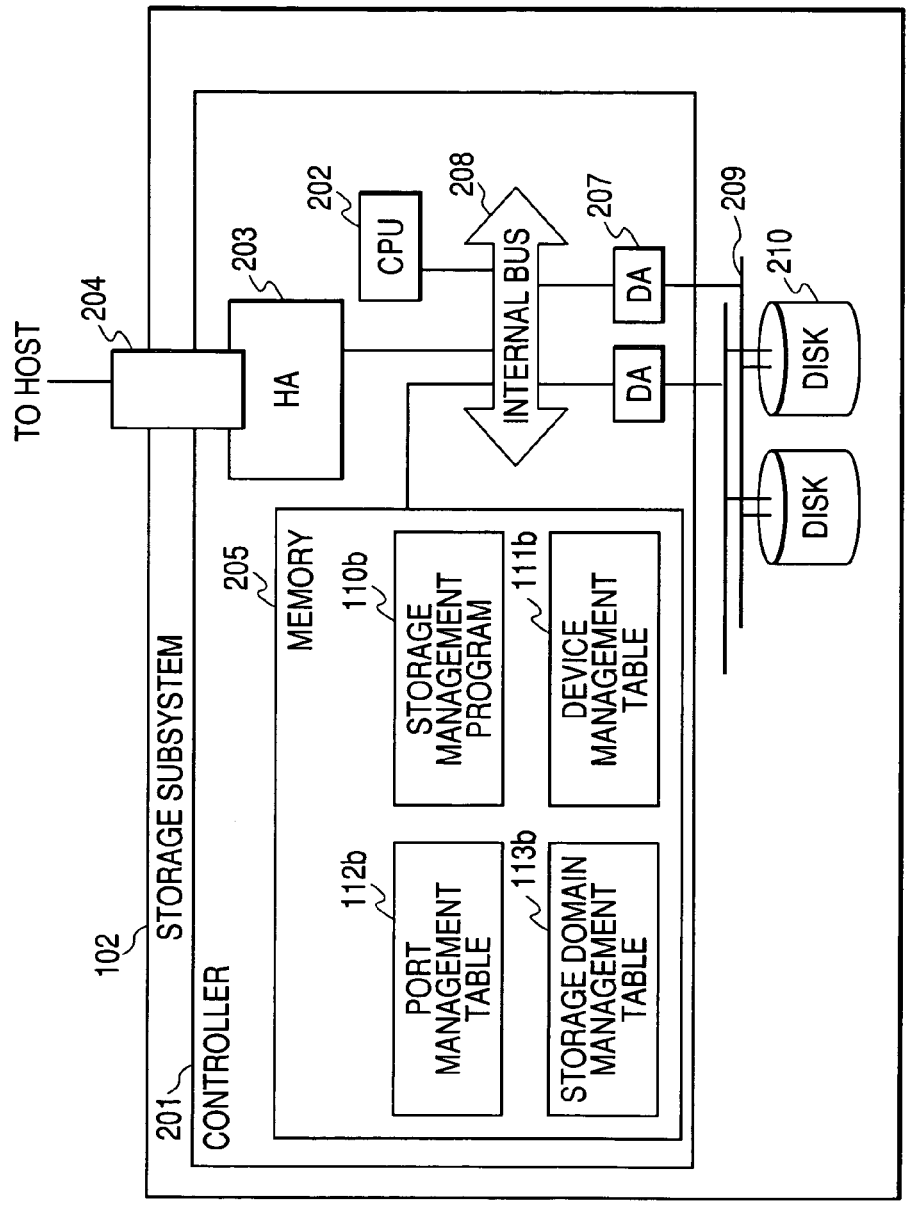
FIG. 2 is a block diagram showing an example of the system configuration of the storage subsystem 102 according to the first embodiment.

FIG. 1 is a block diagram showing the configuration of an information processing system according to the first embodiment. FIG. 2 is a system diagram of a storage subsystem 102 according to the first embodiment.

As shown in FIG. 1, the information processing system includes a host computer 101 serving as a host apparatus, a management computer 103, and the storage subsystem 102. The host computer 102, the management computer 103, and the storage subsystem 102 are connected to a storage area network (SAN) 104. The host computer 101, the management computer 103, and the storage subsystem 102 exchange information via the storage area network (SAN) 104. Note that the host computer 101 and the storage subsystem 102 may be provided in a single form or in a plural form.

The host computer 101 inputs and outputs data to the storage subsystem 102 and to the management computer 103, respectively, via the SAN 104. A workstation, a microcomputer, or a mainframe computer can be used as the host computer 101. Application programs and data base systems are active in the host computer 101.

The management computer 103 manages the storage subsystem 102, the SAN 104, and the host computer 101. More specifically, the management computer 103 includes a processor (CPU: Central Processing Unit) 10, a memory 20, and an FCI/F 11. In the memory 20, a name management program 114, a storage management program 110a, a device management table 111a, a port management table 112a, a storage domain management table 113a, a name management table 115, and a host management table 116 are stored.

The FCI/F 11 controls data transmission and reception that is performed between the management computer 103 and the host computer 101 via the SAN 104. In addition, the FCI/F 11 controls data transmission and reception that is performed between the management computer 103 and the storage subsystem 102 via the SAN 104.

The CPU 10 executes the storage management program 110a to manage the storage subsystem 102, the SAN 104, and the host computer 101. In addition, the CPU 10 executes the name management program 114 to provide a name service to the host computer 101 and the storage subsystem 102 that are connected to the information processing system.

The storage management program 110a is a program that manages the storage subsystem 102 in the system. Information on the storage subsystem 102 in the system is stored in the device management table 111a, the port management table 112a, and the storage domain management table 113a.

The CPU 10 executes the storage management program 110a to thereby periodically acquire various kinds of information on the storage subsystem 102 from a storage management program 110b (to be described later) that operates in the entire storage subsystem 102 in the system. The various kinds of information to be acquired from the storage subsystem 102 may be sent to the management computer 103 every time the storage management program 110b, which operates in the storage subsystem 102, updates the various kinds of information.

The CPU 10 also executes the storage management program 110a to manage the host management table 116. In the host management table 116, the host computer 101 in the system and storage domains are stored in association with each other.

The name management program 114 is a program for providing a name service to the host computer 101 and the storage subsystem 102 using existing protocols, such as iSNS (Internet Storage Name Service). The CPU 10 executes the name management program 114 to communicate with the host computer 101 and the storage subsystem 102 and to manage the name management table 115. In the name management table 115, protocol information concerning the storage subsystem 102, logic devices 105 included in the storage subsystem 102, the host computer 101, and the like is stored. For example, in the case in which iSNS is used as the protocol for the name management program 114, in the name management table 115, information such as "iSCSI NAME", "IP address", and "Discovery Domain" is stored as regards iSCSI (Internet SCSI).

In this embodiment, data concerning the storage subsystem 102 to be stored in the name management table 115 is updated as described below. The CPU 10 executes the storage management program 110a to acquire the data on the storage subsystem 102 from the storage management program 110b operating in the storage subsystem 102 (a CPU 202 that executes the storage management program 110b) and to store the acquired data in a work area of the memory 20. Thereafter, the CPU 10 executes the name management program 114 to read out the data concerning the storage subsystem 102 stored in the work area and to update the data in the name storage table 115 using the read-out data.

The storage subsystem 102 is a storage subsystem that includes a control unit (a controller 201 shown in FIG. 2), which controls exchange of information with the host computer 101, and a disk device (a disk device 210 shown in FIG. 2), which stores information. This embodiment will be explained with reference to an example in which a disk array apparatus is applied as the storage subsystem 102. However, the present invention is not specifically limited to this. A storage subsystem other than the disk array apparatus may be applied to the storage subsystem 102.

The storage subsystem 102 has one or more ports 204 and is connected to the host computer 101 through the SAN 104. The ports 204 are interfaces for a storage subsystem, such as a fiber channel, iSCSI (Internet SCSI), FICON, or ESCON. Note that, in this embodiment, the structure of the SAN 104 and the type of the Interface 104 are not specifically limited. Note that this embodiment will be explained with reference to a case in which the iSCSI is applied to the ports 204 and the IP-SAN is applied to the SAN as an example.

The storage subsystem 102 has one or more logic devices 105. The host computer 101 is capable of accessing the logic devices 105, for example, by reading data from and writing data in the logic devices 105 via the ports 204. In this case, the host computer 101 uses a protocol for a storage subsystem provided by the respective ports 204. iSCSI, FCP (Fibre Channel Protocol for SCSI), and FC-SB (Single Byte Protocol) are used in the IP-SAN, the fiber channel, and the FICON, respectively. Note that the type of protocol used in this embodiment is not specifically limited.

Next, the structure of the storage subsystem 102 will be described in detail with reference to FIG. 2.

As shown in FIG. 2, the storage subsystem 102 includes a controller 201 and one or more disk devices 210. The controller 201 includes a host adapter 203, a memory 205, disk adapters 207, and a processor (CPU: Central Processing Unit) 202. The numbers of the respective devices are preferably multiplexed from the viewpoint of performance and reliability.

The host adapter 203 controls a protocol concerning the ports 204, such as the iSCSI.

Programs and data concerning storage domain control are stored in the memory 205. More specifically, in the memory 205, the storage management program 110b, a device management table 111b, a port management table 112b, and a storage domain management table 113b are stored.

In addition, in the memory 205, other than these programs and data, a control program and control information necessary for controlling the storage subsystem 102, and cache data 110 concerning input/output processing for the host computer 101 are stored. It is preferable to multiplex the memory 205 or to multiplex a power supply to the memory 205 in order to realize high reliability.

The disk adapters 207 perform protocol processing concerning a disk interface 209, such as a fiber channel, in the same manner as the host adapter 203.

The disk devices 210 receive a command for reading, writing, or the like from the controller 201 via the disk interface 209 and perform processing defined by the command. It is preferable to duplex the disk interface 209 in order to realize high reliability.

In the storage subsystem 102, the plural disk devices 210 are combined to form a redundant structure, in which logic devices are created, and the logic devices 105 (see FIG. 1) are created by one or more logic devices.

The CPU 202 executes processing concerning the storage subsystem 102. More specifically, the CPU 202 is connected to the host adapter 203 and the disk adapters 207 in the controller 201 via an internal bus 208. The CPU 202 controls the host adapter 203 and the disk adapters 207. In addition, the CPU 202 is connected to the memory 205 via the internal bus 208, and it loads and executes the programs and the data (the storage management program 110b, the device management table 111b, the port management table 112b, and the storage domain management table 113b) stored in the memory 205.

The storage management program 110b is a program for managing information on other resources such as the ports 204 and the logic devices 105 concerning the storage subsystem 102 using the respective tables (the device management table 111b, the port management table 112b, and the storage domain management table 113b).

The device management table 111b is a table for managing association of attributes of the devices 105 and the storage domains. The port management table 112b is a table for managing association of the ports 204 of the storage subsystem 102 and the storage domains. The storage domain management table 113b is a table for managing attributes of the storage domains.

Note that the storage management program 110b referred to above is installed in a storage medium, which is provided in each storage subsystem 102, from other devices using a portable storage medium such as a compact disk or a magneto-optical disk or via a network.

Next, the storage domain, which is a management unit for the information processing system according to the first embodiment, will be explained with reference to FIG. 3.

Figure 3:
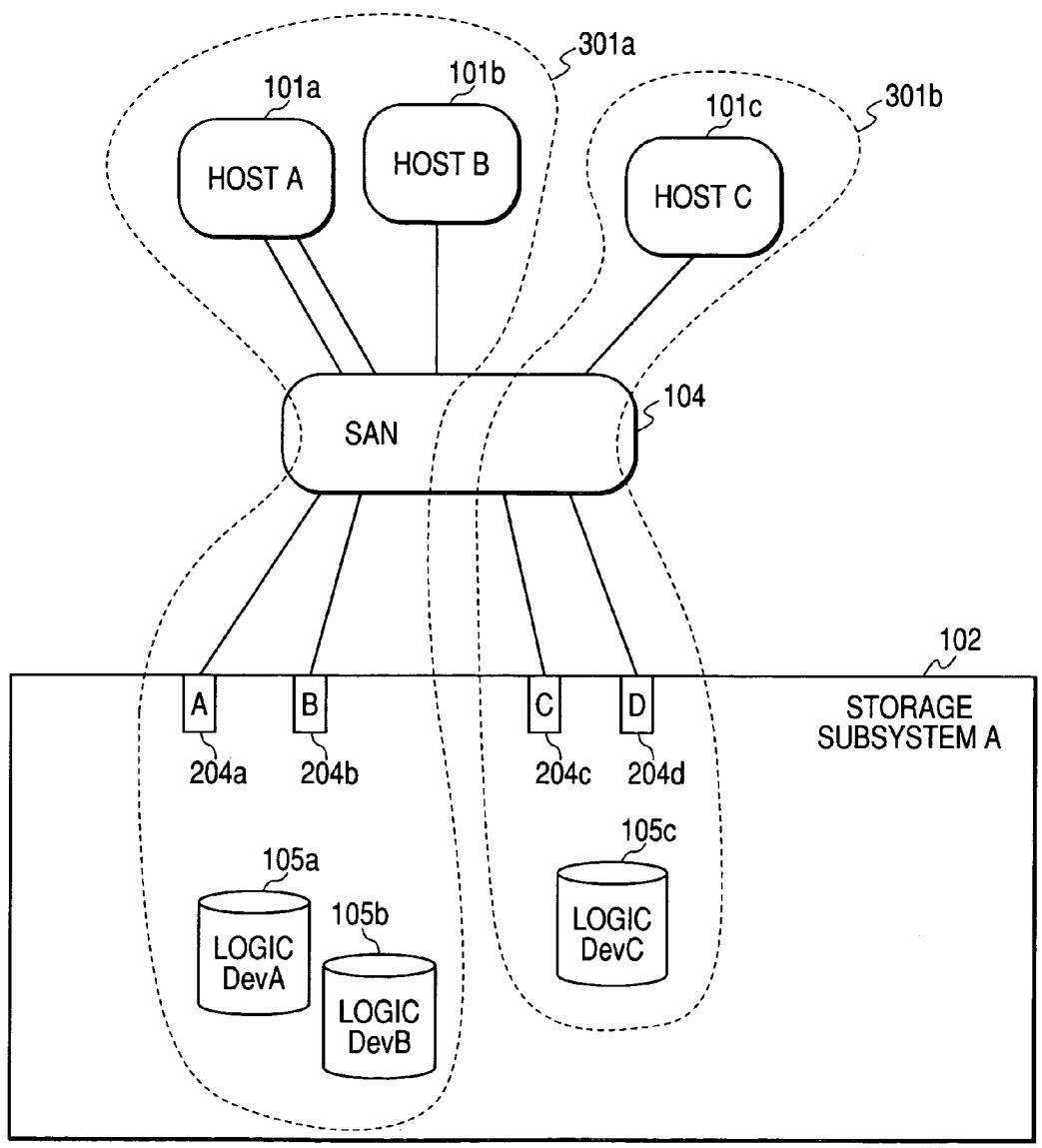
FIG. 3 is a diagram illustrating a storage domain that is a management unit for the storage subsystem.

FIG. 3 is a diagram which will be used for explaining the storage domain that is a management unit for the storage subsystem according to this embodiment.

In storage domains 301, a group of logic devices 105 and a group of ports 204 of the storage subsystem 102, and the host computers 101 are classified. The host computers 101 are classified according to certain attributes, such as departments in which the host computers 101 are used, performance, physical connection, and the like. Note that the storage domains 301 may be managed hierarchically using certain attributes, such as departments, application programs, users, and the like.

The group of logic devices 105, the group of ports 204, and the host computers 101, which are classified in the same storage domains 301, can be combined arbitrarily. That is, the host computers 101 can access the logic devices 105 belonging to the same storage domain through arbitrary ports belonging to the same storage domain.

In the example shown in the figure, the group of logic devices 105, the group of ports 204, and the host computers 101 which the information processing system has are classified in two storage domains (301a and 301b). More specifically, logic devices 105a and 105b, ports 204a and 204b, host computers 101a and 101b belong to a storage domain 301a of a storage subsystem A. A logic device 105c, ports 204c and 204d, and a host computer 101c belong to the storage domain 301b.

Since the host computer 101a belongs to the storage domain 301a, the host computer 101a is capable of accessing the logic devices 105a and 105b. In accessing the logic devices 105a and 105b, the host computer 101a can use the port 204a and 204b.

Since the host computer 101c belongs to the storage domain 301b, the host computer 101c is capable of accessing the logic device 105c. In accessing the logic device 105c, the host computer 101c can use the ports 204c and 204d.

Specific criteria for classifying the group of logic devices 105, the group of ports 204, and the host computer 101 in the storage domains 304 are not limited in this embodiment. For example, as the criteria for classification, security concerning propriety of access and the like, performance and reliability concerning throughput and delay at the port 204 and the SAN 104,and the like may be used.

In the case in which classification is performed using criteria concerning security, association with an existing user management program or the like is possible. For example, as the existing user management program, association with an Active Directory (registered trademark) server installed in Windows (registered trademark), which is an OS provided by Microsoft Corporation, is possible. In addition, for example, association with an LDAP (Lightweight Directory Access Protocol) server and an NIS (Network Information Service) server is possible in a UNIX environment.

For example, in the iSCSI, iSNS or SLP (Service Location Protocol) can also be used. In an iSNS server, association with the LDAP or the like is possible, and a management classification, such as departments, can usually be successful.

Concerning the criteria concerning performance, it is advisable to take into account the following description. For example, in a company or the like, it may be required to secure performance for applications, such as a database, and special users, such as an administrator, even in an identical department. Thus, as in the case of the security management, it is advisable to provide classification concerning performance.

For example, applications and users with low priorities and applications and users with high priorities are classified in separate storage domains 301. The storage domains 301 are set such that the ports 204 are allocated to specific applications and a port is shared by the other applications.

The topology of a network may affect performance. For example, the path from an arbitrary host to the respective ports 204 in the identical storage domain 301 may be different. In this case, the performance (throughput, delay) is different. Therefore, in the case in which an IP network is used, a sub-network of an IP address may be analyzed to perform classification. Alternatively, a command for tracing a network path (e.g., a traceroute command in the Unix environment) may be used to perform classification on the basis of paths from ports in the identical storage domain 301.

In this way, in this embodiment, the group of logic devices 105, the group of ports 204, and the host computers 101 are classified in the storage domains 301a such that the logic devices and the ports belonging to the same storage domain can be combined arbitrarily. Therefore, it becomes unnecessary to perform setting for associating logic devices and ports in a one-to-one correspondence as in the conventional storage subsystem, and the complexity of management of the storage subsystem can be eliminated.

In addition, in this embodiment, the group of logic devices 105, the group of ports 204, and the host computers 101 can be classified according to certain attributes, such as departments, application programs, and users. This makes it possible to access a logic device corresponding to an attribute of a user efficiently.

Next, an example of the data structures of the respective tables (the storage domain management table 113, the port management table 112, the device management table 111, the host management table 116, and the name management table 115) included in the information processing system according to this embodiment will be described with reference to FIGS. 4 to 8.

FIG. 4 is a diagram showing an example of the data structure of the storage domain management table 113 according to this embodiment. The storage domain management table 113 is a table for holding attributes of the storage domains 301.

The storage domain management table 113 includes an entry 401 in which a "storage domain ID", which is an identifier of a storage domain, is stored, an entry 402 in which a "storage domain name" indicating a name for management of the storage domain is stored, and an entry 403 in which "attribute data" indicating an attribute of the storage domain is stored. The "storage domain names" and the "attribute data" are stored in the entries 402 and 403 in association with the "storage domain IDs" stored in the entry 401.

In the example shown in FIG. 4, data with the "storage domain ID" of "sa", the "storage domain name" of "Account", and the "attribute data" of "accounting" is stored. In addition, data with the "storage domain ID" of "sb", the "storage domain name" of "Develop", and the "attribute data" of "development" is stored.

The CPU 10 of the management computer 103 executes the storage management program 110a, for example, to display a storage domain setting screen on a display device (not shown). The CPU 10 of the management computer 103 executes the storage management program 110a to receive definitions of the storage domains (setting for "storage domain IDs", "storage domain names", and "attribute data") from an administrator via an input device (not shown). The CPU 10 of the management computer 103 executes the storage management program 110a to store the received definitions in the storage domain management table 113.

Note that, in the above description, the CPU 10 of the management computer 103 executes the storage management program 110a to receive the definitions of the storage domains from the administrator and to store the received definitions in the storage domain management table 113. However, the CPU 202 of the storage subsystem 102 can also execute the storage management program 110b to perform the same processing as described above.

In addition, the administrator may input the "attribute data" and the "storage domain names" by operating the storage management program 110a that is stored in the management computer 103. However, the efficiency is improved if the "attribute data" and the "storage domain names" are set in association with the management program, such as Active Directory, LDAP, or NIS.

FIG. 5 is a diagram showing a data structure of the port management table 112 according to this embodiment. The port management table 112 is a table for associating the ports 204, the storage subsystem 102, and the storage domains 301.

The port management table 112 includes an entry 501 in which an "apparatus ID" serving as an apparatus identifier for the storage subsystem 102 is stored, an entry 502 in which a "port ID" serving as an identifier for the port 204 is stored, an entry 503 in which an "address" on the SAN 104 of each of the ports 204 is stored, an entry 504 in which a "utilization rate" of the port 204 is stored, an entry 505 in which "state data" indicating a state of the port is stored, and an entry 506 in which a "storage domain ID" of the storage domain 301 to which the port 204 belongs is stored.

The respective data are stored in the entries 502 to 506 in association with the "apparatus ID" stored in the entry 501. The respective data are stored in the entries 503 to 506 in association with the entry 502.

Note that, in this embodiment, one storage domain 301 is allocated to one port. However, it is possible to allocate plural storage domains 301 to any port. In the case in which plural storage domains are allocated to one port, plural storage domain IDs, which are stored in the entry 506, are set. For example, in the case of the IP network, it is advisable to use IP addresses and port numbers for the addresses stored in the entry 503.

In the example shown in FIG. 5, "A1", "90%", "overload", and "sa" are stored in the entries 503 to 506 corresponding to the entry 502 in which "A" is stored, respectively. This indicates that a port A included in the storage subsystem 102 with the apparatus ID of "storage A" has an "address" on the SAN 104 of "A1" and belongs to the storage domain 301 having the storage ID of "sa". In addition, this indicates that the port A has a port utilization rate of "90%" and is currently in an overload state.

The CPU 10 of the management computer 103 (or the CPU 202 of the storage subsystem 102) executes the storage management program 110a (or the storage management program 110b) to perform management of the port management table 112. The CPU 10 of the management computer 103 executes the storage management program 110a to associate the apparatus, the ports, and the storage domains 301 on the port management table 112.

The CPU 10 of the management computer 103 executes the storage management program 110a to periodically acquire a load (port utilization rate) and a configuration state of the ports 204 of the storage subsystem 102 and to judge a current "state" on the basis of the acquired "port utilization rate". The CPU 10 of the management computer 103 (or the CPU 202 of the storage subsystem 102) stores the calculated "port utilization rate" and the judged "state" in corresponding entries in the port management table 112.

Note that, although a form of the "state" to be judged is not limited, for example, states of "overload", "normal", "offline", and "blocked" may be indicated as the form of the "state" to be judged. Then, the CPU 10 of the management computer 103 acquires a configuration of the storage subsystem 102 periodically or every time the configuration is changed to thereby set states of "normal", "offline", and "blocked". Although the judgment on overload is different depending upon the system, in general, it is advisable to set about 80% to 90% as a threshold value.

The CPU 10 of the management computer 103 performs port allocation processing to create an available port list on the basis of information in the port management table 112 (port allocation processing will be described later).

FIG. 6 is a diagram showing an example of the data structure of the device management table 111 according to this embodiment.

The device management table 111 includes an entry 601 in which an "apparatus ID" serving as an apparatus identifier for the storage subsystem 102 is stored, an entry 602 in which a "device ID" specifying the logic device 105 in the storage subsystem 102 is stored, and an entry 607 in which a "storage domain ID" serving as an identifier for the storage domain 301 corresponding to each of the logic device is stored.

The device management table 111 includes an entry 603 in which a "protocol" for the logic device 105 is stored, an entry 604 in which a "size" indicating a capacity of the logic device 105 is stored, an entry 605 in which "authentication information" indicating information for authentication for the logic devices 105 is stored, and an entry 606 in which a "state" indicating whether the logic device 105 is "used" or "not used" is stored, such that general attributes of the respective logic devices 105 can also be managed.

Note that, in this embodiment, the protocols to be stored in the entry 603 are not specifically limited. For example, "iSCSI", "FCP", and "SCSI" can be used for the protocols. As the authentication information in the entry 605, authentication information on the respective devices 105 in the "iSCSI", for example, key values, passwords, and the like are stored.

The device management table 111 is managed by the CPU 10 of the management computer 103 that executes the storage management program 110*a* (or the CPU 202 of the storage subsystem 102 that executes the storage management program 110*b*). More specifically, the CPU 10 of the management computer 103 (or the CPU 202 of the storage subsystem 102) executes the storage management program 110*a* (or the storage management program 110*b*) to store data corresponding to the respective entries 601 to 607. The CPU 10 of the management computer 103 (or the CPU 202 of the storage subsystem 102) monitors the states of use of the logic devices periodically to update the data in the entry 606.

FIG. 7 is a diagram showing an example of the data structure of the host management table 116 in this embodiment. As shown in the figure, the host management table 116 includes an entry 701 in which an "apparatus ID" serving as an apparatus identifier for the host computer 101 is stored, an entry 702 in which a "port ID" identifying a port of the host computer 101 is stored, an entry 703 in which an "address" allocated to each of the ports is stored, an entry 704 in which a "protocol" supported by each of the ports is stored, an entry 705 in which a "state information" indicating a state of the port of the host computer 101 is stored, and an entry 706 in which a "storage domain ID" serving as an identifier for the storage domain 301 corresponding to the port of the host computer 101 is stored. Note that, in the "state information" indicating the state of the port, data indicating whether the state of the port is "normal" or "abnormal" is stored.

The host management table 116 is managed by the CPU 10 of the management computer 103 that executes the storage management program 110*a*. The CPU 10 of management computer 103 executes the storage management program 110*a* to store corresponding data in the respective entries 701 to 706. The CPU 10 periodically acquires the data indicating states of the ports 204 of the respective hosts from the storage subsystem 102 and stores the data indicating the "state information" in the entry 705.

FIG. 8 is a diagram showing an example of the data structure of the name management table 115 according to this embodiment. Name management information in the SAN 104 is stored in this name management table 115.

The name management table 115 is managed by the CPU 10 of the management computer 103 that executes a name management program. The CPU 10 of the management computer 103 executes the name management program to provide a name service to the host computer 101 and the storage subsystem 102 utilizing data in the name management table 115. This embodiment will be described with reference to iSNS, which is a representative name server of the iSCSI, as an example of the name management program 114.

As shown in the figure, the name management table 115 includes an entry 801 in which an "EID (Entity ID)" serving as an identifier for iSNS is stored, an entry 802 in which an "iSCSI Name" serving as an identifier for an iSCSI node is stored, an entry 803 in which a "DD (Discovery Domain)" defining a name service range in the iSNS is stored, an entry 804 in which a "Node Type" indicating a type such as Initiator/Target of the iSCSI nodes is stored, and entries 805 and 806 in which a "portal Group" and a "Portal Address: Port" serving as information on the port 204 are stored, respectively.

Respective iSCSI devices (e.g., the host computers 101) request the CPU 10 of the management computer 103, which executes the name management program 114, to register the iSCSI nodes when an administrator instructs then to do so or starts the iSCSI devices. The information requested to be registered include the "DD (Discovery Domain)", the "Node Type", the "Portal Group", and the "Portal Address: Port".

In an information processing system including a normal storage subsystem, the host computer 101 and the storage subsystem 102 request the CPU 10 of the management computer 103, which executes the name management program 114, to register the iSCSI node individually. However, in this embodiment, concerning data on the respective logic devices 105, the CPU 202 of the storage subsystem 102 executes the storage management program 110*b* to send configuration information to the CPU 10 of the management computer 103. The CPU 10 of the management computer 103 executes the storage management program 110*a* to receive the sent configuration information and to store the received configuration information in a work area of the memory 20. Thereafter, the CPU 10 of the management computer 103 executes the name management program 114 to read out the stored configuration information and to register the configuration information in the name management table 115.

The CPU 10 executes the name management program 114 to perform processing for giving an EID (Entity ID), which is an identifier for an iSNS, to an iSCSI node to register the iSCSI node in the entry 801. The respective ISCSI devices are capable of requesting the CPU 10 of the management computer 103 to register data in the name management table 115, change the data, and delete the data from the name management table 115 using the EID. In this embodiment, the management is facilitated if an arbitrary "DD" is associated with one of the storage domains 301.

In FIGS. 4, 5 and 6, general information is shown. In the following explanation, correspondence in a case of an iSNS server will be described. More specifically, the "Portal Address: Port" stored in the entry 806 corresponds to the address in the entry 503 shown in FIG. 5. The "iSCSI Name" in the entry 802 corresponds to the "device ID" in the entry 502 shown in FIG. 5.

Figure 9:
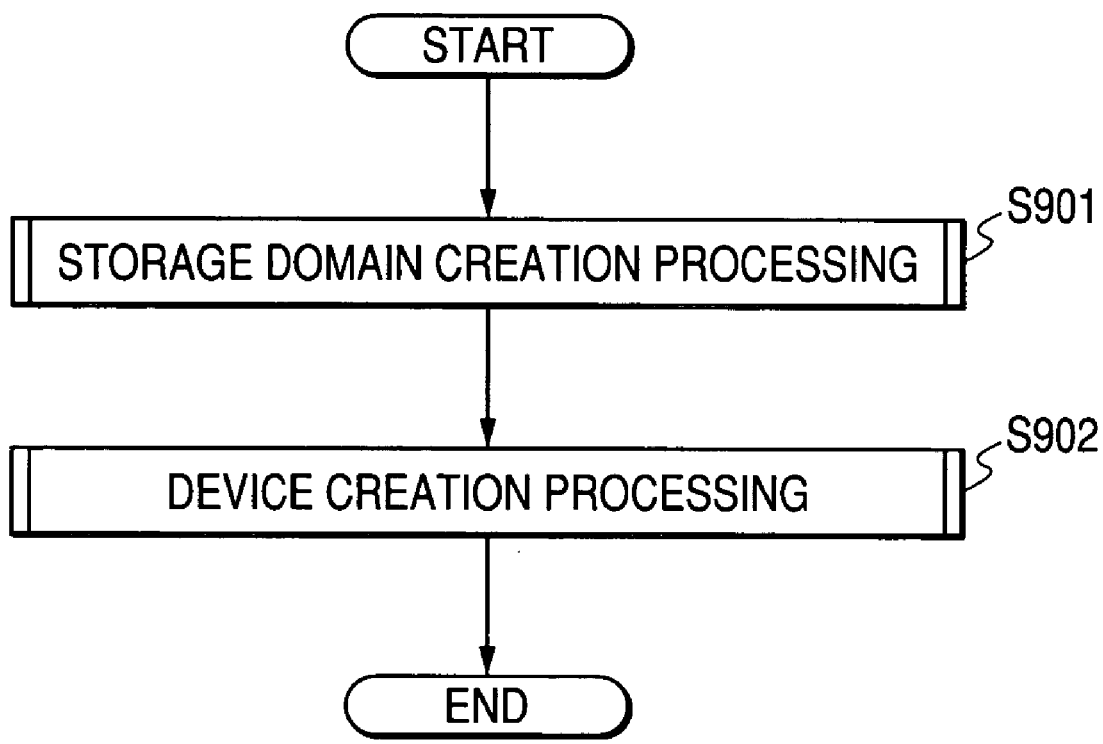
FIG. 9 is a flow diagram showing the process flow of initial setting processing that is performed by the information processing system.

FIG. 9 is a diagram which will be used for explaining a flow of initial setting processing that is performed by the information processing system according to this embodiment. The information processing system according to this embodiment performs initial setting processing when the system is installed.

First, the CPU 10 of the management computer 103 of the information processing system executes the storage management program 110a to receive a setting for the storage domains 301 from an administrator (S901). More specifically, the CPU 10 of the management computer 103 executes the storage management program 110a to display a setting screen on a display device (not shown) and receive the setting for the storage domains 301 from the administrator via an input device (not shown). The CPU 10 executes the storage management program 110a to add or update the received information on the storage domains in the storage domain management table 113 and the port management table 112. Note that the CPU 10 of the management computer 103 transfers information on the storage domains and the like, which is inputted from the administrator, to the storage subsystem 102 via the network. The controller 203 of the storage subsystem 102 adds or updates the information in the storage domain management table 113b, which is included in the controller 201, on the basis of the received information.

Note that, in the above explanation, the administrator sets the storage domains 301 manually. However, the present invention is not limited to this. Other various forms are possible. For example, the administrator may input the storage domains 301 with reference to management information of other management programs, or a storage management program may directly refer to the management information of the other management programs to propose the storage domains 301 to the administrator, in response to which the administrator corrects the storage domains 301.

The CPU 10 of the management computer 103 creates the logic devices 105 after setting the storage domains 301 (S902). Device creation processing in this embodiment is substantially the same as the device creation processing of the storage subsystem 102 according to the conventional technique. The device creation processing employed in this embodiment is different from the device creation processing in accordance with the conventional technique only in that logic devices are allocated to the storage domains 301. Note that a specific procedure for the device creation processing will be described later. This device creation processing is carried out every time a device is created.

Figure 10:
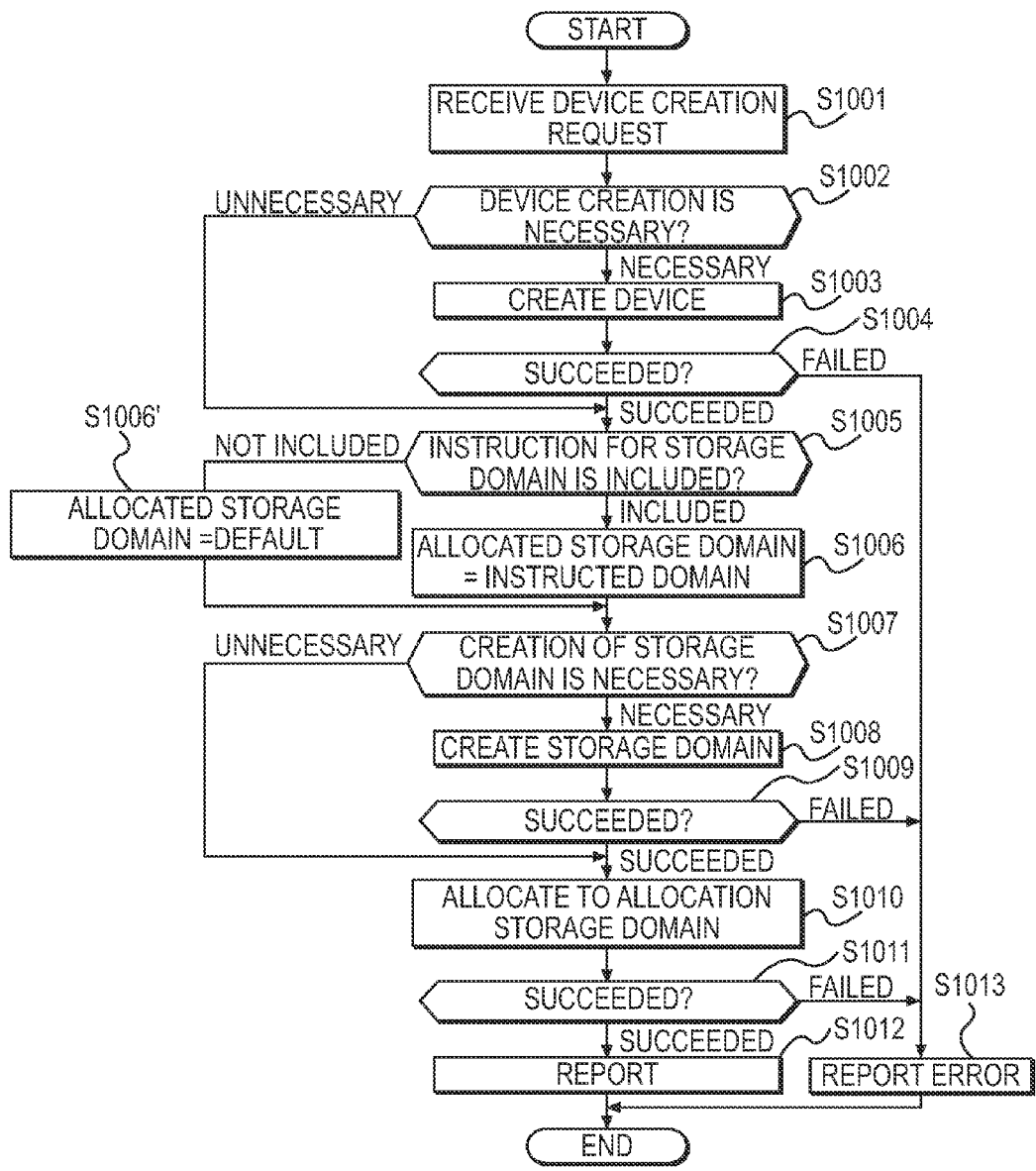
FIG. 10 is a flow diagram showing the flow of logic device creation processing that is performed by the information processing system.

FIG. 10 is a diagram which will be used for explaining a flow of logic device creation processing that is performed by the information processing system according to this embodiment. Note that, in the following explanation, a case in which the logic device creation processing is executed by the management computer 103 will be described. However, the same processing can be performed by the storage subsystem 102. In addition, the CPU 10 of the management computer 103 executes the storage management program 110a, whereby the following processing as shown in FIG. 10 is realized. However, for simplification of the explanation, it is assumed that the storage management program 110a is a subject of the operation.

First, an administrator inputs a logic device creation request to the management computer 103 via an input device. The storage management program 110a receives the request for device creation from the administrator (S1001). Note that, more specifically, the request for device creation is information shown on the device management table 111 (a size and authentication information of the logic device 105 that is desired to be created, the storage domain 310 that is desired to be allocated to the logic device 105, etc.).

The storage management program 110a analyzes the information received in S1001 to judge whether it is necessary or unnecessary to create the logic device 105 (S1002). Then, if it is judged that it is necessary to create the logic device 105, the storage management program 110a proceeds to S1003 and S1004. On the other hand, if it is judged that it is unnecessary to create the logic device 105, the storage management program 110a proceeds to S1005. The case in which it is unnecessary to create the logic device 105 is a case in which the logic device 105 matching attributes requested in S1001 is already present, and it is unnecessary to create the logic device 105 anew.

In S1003 and S1004, the storage management program 110a carries out processing for creating the logic device 105. In the case in which there are unallocated logic devices 105 which match the attributes requested in S1001, or an unused area in the storage subsystem 102 of sufficient size, the storage management program 110a creates the logic device 105. More specifically, the storage management program 110a instructs the storage subsystem 102 to create the requested logic device 105. The storage subsystem 102, which has received the instruction, creates the logic device 105 based upon requested contents and informs the management computer 103 of the result of the creation. If the logic device 105 has been successfully created, the storage management program 110a proceeds to the processing in S1005. On the other hand, if it is impossible to create the logic device 105 matching the requested attributes, the storage management program 110a generates an error report (S1013) to end the processing. Note that specific means for the error report performed by the storage management program 110a is not specifically limited. For example, an error screen is displayed on a display device.

In S1005, the storage management program 110a performs processing for the storage domains 301. More specifically, the storage management program 110a judges whether or not an instruction for the storage domain 301, to which the logic device 105 is allocated (allocation storage domain 301), is included in the request received in S1001. If the instruction for the storage domain 301 has not been received, the storage management program 110a proceeds to 1006' and sets the default storage domain 301 as the allocation storage domain 301 and proceeds to S1007. On the other hand, if the instruction about the storage domain 301 has been received, the storage management program 110a proceeds to S1006.

In S1006, the storage management program 110a sets the instructed storage domain as the allocation storage domain 301 and proceeds to S1007.

In S1007, the storage management program 110a judges whether or not the allocation storage domain 301 is present on the basis of the storage domain management table 113. If the allocation storage domain 301 is present, the storage management program 110a judges that it is unnecessary to create the storage domain 301 anew, and proceeds to S1010. On the other hand, if the allocation storage domain 301 is not present, the storage management program 110a judges that it is necessary to create the storage domain 301 anew, and proceeds to S1008 and S1009.

In S1008 and S1009, the storage management program 110a creates the storage domain 301 and adds and updates information on the created storage domain 301 in the storage domain management table 113. Thereafter, the storage management program 110a informs the storage subsystem 102 of updated or added information on the storage domain 301. The storage subsystem 102, which has received the information, adds or updates the various tables included in the storage subsystem 102 on the basis of the received information. In this case, the storage subsystem 102 updates information on the various tables to thereby associate respective ports included in one storage domain and respective logic devices using the updated information on the storage domain 301. Therefore, when the host computer 101 uses the logic devices included in the one storage domain, the host computer 101 only has to inform the management computer 103 of the storage domain (designate the storage domain). In the case in which a command or the like is received in a port included in one storage domain, if the command is for access to a logic device included in the same storage domain, the storage subsystem 102 performs processing, such as reading or the like of data, and if the command is for access to a logic device included in a different storage domain, it rejects the access. Note that the storage subsystem 102 may directly receive an increase or the like of a port from the administrator or the like and update the various tables included in the storage subsystem 102. In this case, the contents of the various tables included in the management computer 103 and the contents of the various tables included in the storage subsystem 102 will be different. In this case, as described later, the management computer 103 receives differential data from the storage subsystem 102 and updates the contents of the various tables included in the management computer 103. In addition, the storage management program 110a also adds and updates information on storage domains in the port management table 112. On the other hand, if the storage management program 110a has failed in the creation of the storage domain 301, the storage management program 110a reports an error and ends the processing (S1013).

Subsequently, the storage management program 110a allocates the device 105 to the allocation storage domain 301 (S1010). More specifically, the storage management program 110a stores an allocation storage domain ID in the entry 607 of the device management table 111. If the storage management program 110a has succeeded in the allocation of the device 105 to the storage domain 301, the storage management program 110a reports that the allocation is successful. If the storage management program 110a has failed in the allocation of the device 105 to the storage domain 301, the storage management program 110a reports an error (S1011 to S1013).

Next, port allocation processing, which is performed by the information processing system according to this embodiment, will be described with reference to FIGS. 11 to 15.

Figure 11:
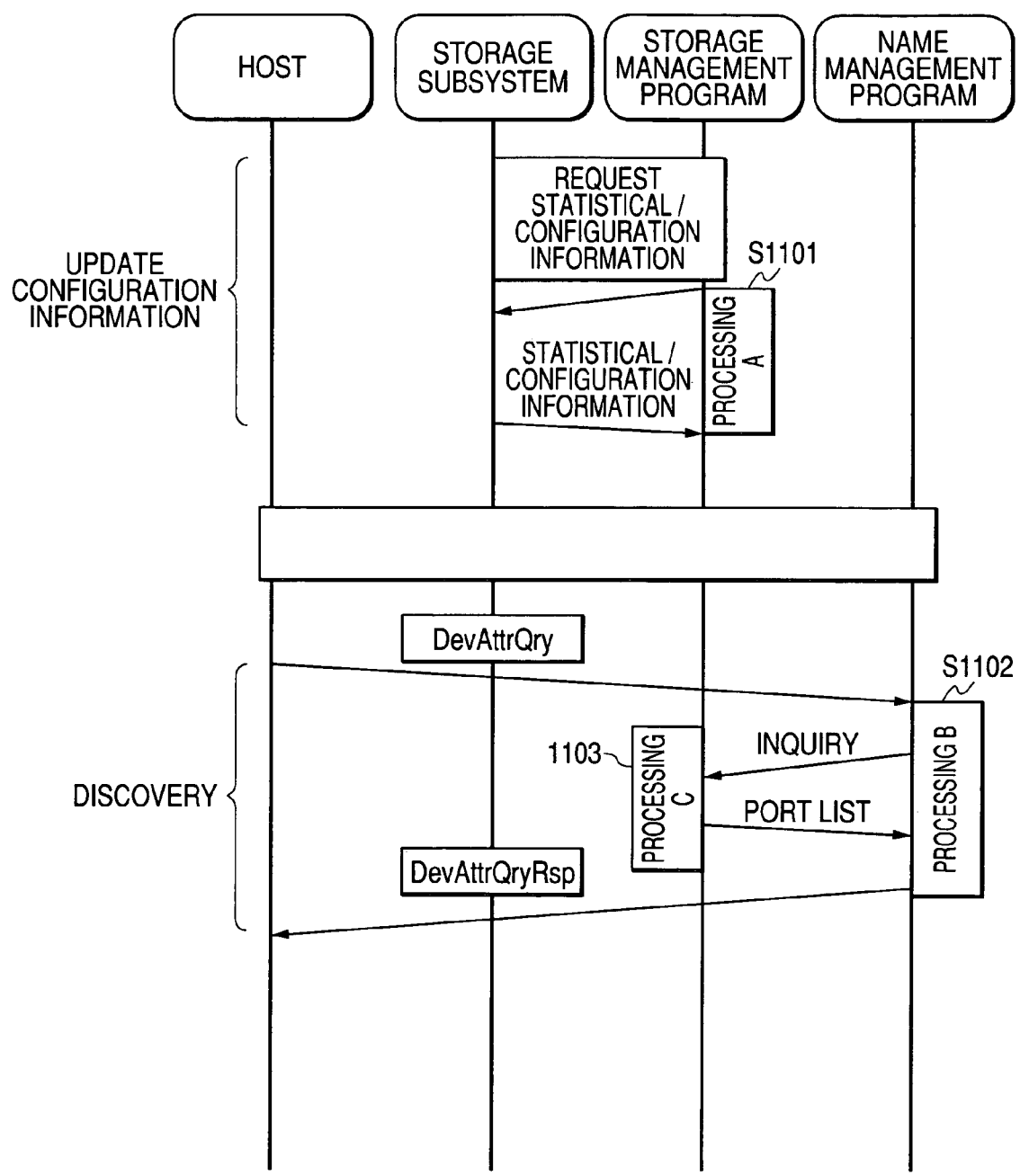
FIG. 11 is a diagram illustrating the flow of port allocation processing.

FIG. 11 is a diagram which will be used for explaining the flow of the port allocation processing according to this embodiment. Note that the CPU 10 of the management computer 103 executes respective programs (the storage management program 110a and the name management program 114), whereby the following processing is realized. However, in the following explanation, for simplification of the explanation, the respective programs (the storage management program 110a and the name management program 114) are assumed to be subjects of the operation.

In this embodiment, allocation of ports is performed by association of the name management program 114 and the storage management program 110a.

In addition, in this embodiment, port information of iSCSI with respect to the logic devices 105 is determined by the storage management program 110a when the storage management program 110a requests discovery. Therefore, the port information (Portal Group, Portal IP Address: Port) of the entries 805 and 806 in the name management table 115 is unregistered until discovery is requested for the logic devices 105.

Therefore, the name management program 114 registers the port information of the entries 805 and 806 in the name management table 115 after receiving a discovery request. Note that the name management program 114 stores information on the host computer 101, which includes port information, in the name management table 115 first.

In this embodiment, processing for carrying out the port allocation processing is roughly divided into two processes, namely, "configuration information update processing" and "discovery processing".

First, the configuration information update processing will be explained.

The storage management program 110a of the management computer 103 performs the "configuration information update processing". More specifically, the storage management program 110a performs processing for acquiring statistical information and configuration information from the storage subsystem 102 and the host computer 101 that are managed by the storage management program 110a. In the case in which update of configuration information is performed, the storage management program 110a carries out update processing for the device management table 111 and the port management table 112 (processing A 1101).

Note that the acquisition of configuration information performed by the storage management program 110a may be carried out periodically, or when information update is performed, the host computer 101 or the storage subsystem 102 may inform the storage management program 110a that the configuration information has been updated. The storage management program 110a maintains the latest information in this way.

Next, the "discovery processing", which is performed by the name management program 114, will be described. The name management program 114 receives a request for discovery from the host computer 101. Here, in iSNS used in this embodiment, "DevAttrQry" corresponds to the discovery request. Upon receiving the discovery request, the name management program 114 carries out the discovery processing (processing B1102).

In the step of the port allocation processing in the discovery processing (processing B1102), the name management program 114 requests the storage management program 110a to perform allocation processing for the ports 204. The storage management program 110a, which has received the request, sends a list of available ports to the name management program 114. The name management program 114 updates the name management table 115 and, then, sends a result of allocation (list of ports) to the host computer 101.

In this way, in this embodiment, the name management program 114 can acquire the latest information from the storage management program 110a when the port allocation processing is performed. Therefore, according to this embodiment, port allocation, on which an operation state such as load and failure is reflected accurately, can be performed.

Next, the "configuration information update processing" will be described in detail with reference to FIG. 12.

Figure 12:
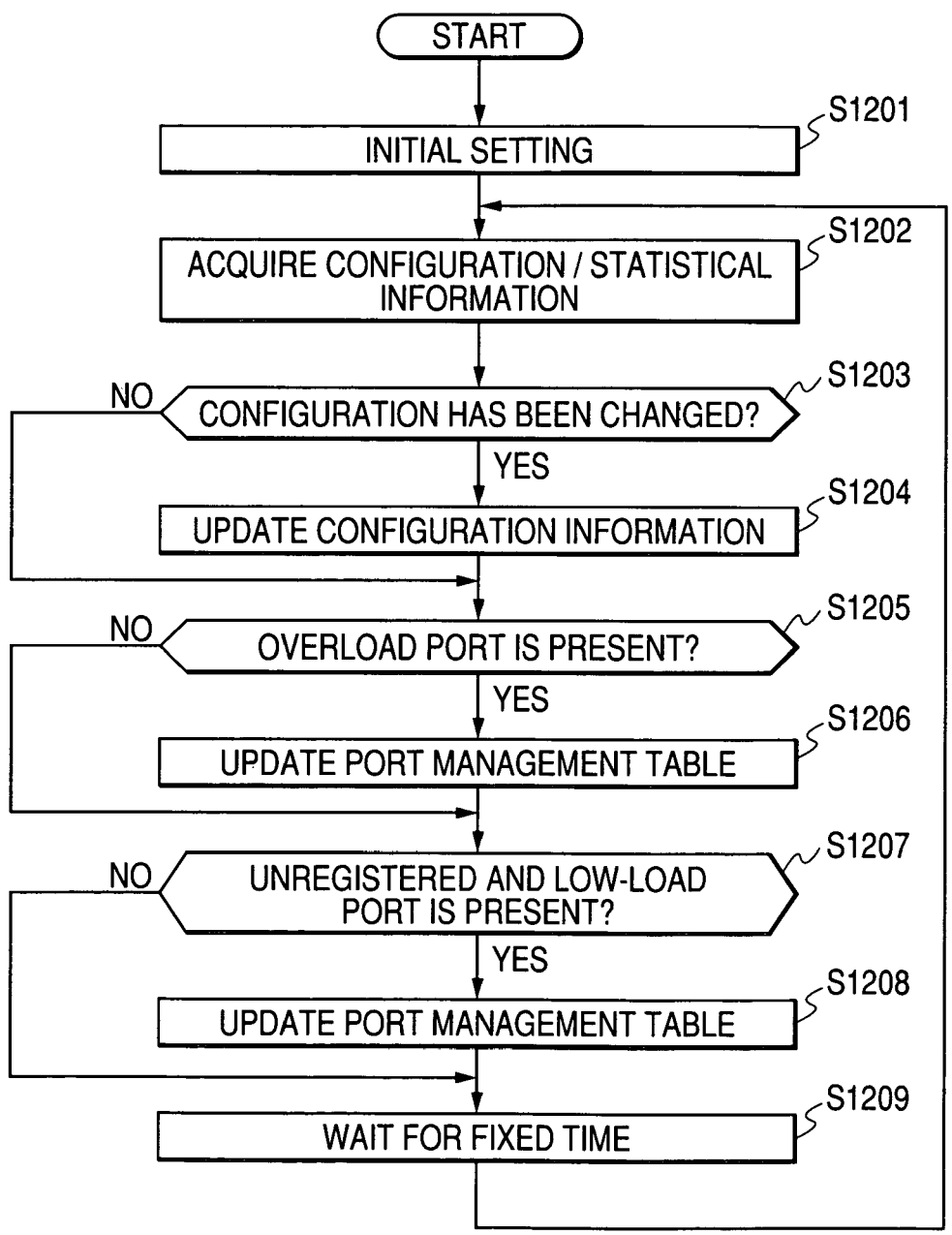
FIG. 12 is a flow diagram showing the flow of configuration information update processing that is performed by the information processing system.

FIG. 12 is a diagram which will be used for explaining the flow of the configuration information update processing that is performed by the information processing system according to this embodiment. Note that the CPU 10 of the management computer 103 executes the respective programs (the storage management program 110a and the name management program 114) or the CPU 202 of the storage subsystem 102 executes the storage management program 110b, whereby the following processing is realized. However, in the following explanation, for simplification of the explanation, the respective programs (the storage management program 110a, the storage management program 110b, and the name management program 114) are assumed to be subjects of the operation.

In starting the management computer 103, the storage management program 110a acquires the configuration information from the storage subsystem 102 and performs initialization of information in the respective tables on the basis of the acquired configuration information (S1201).

Thereafter, the storage management program 110a acquires configuration information from the storage subsystem 102 under the management thereof at a predetermined interval (S1202). More specifically, the storage management program 110a inquires presence as to the or absence of a change in the configuration information (information on addition of the ports 204, information on a utilization rate of the ports, etc.) from the storage management program 110b of the storage subsystem 102. The storage management program 110b of the storage subsystem 102, which has received this inquiry, sends differential data to the storage management program 110a. Then, the storage management program 110a receives the differential data sent by the storage management program 110b of the storage subsystem 102.

The storage management program 110a judges whether or not the configuration of the storage subsystem 102 has been changed on the basis of the received differential data. If there is no data indicating the change in the configuration of the storage subsystem 102 (addition of the ports 204, etc.) in the differential data, the storage management program 110a judges that the configuration of the storage subsystem 102 has not been changed, and proceeds to S1205. On the other hand, if there is data indicating that a change has occurred in the configuration of the storage subsystem 102 (addition of the ports 204, etc.) in the differential data, the storage management program 110a judges that the configuration of the storage subsystem 102 has been changed, and proceeds to step S1204 (S1203).

In step S1204, if the configuration has been changed, for example, if an increase or decrease from the present configuration information, a recovery from a blocked state, a blocked state from a normal state, or the like has occurred, the storage management program 110a registers new configuration information in corresponding entries in the device management table 111a, the port management table 112a, and the storage domain management table 113a.

In the case in which there is a port added anew, the storage management program 110a adds the port in the port management table 112, sets a storage domain ID for the port, and sets a state of the port as "normal". Note that the storage management program 110a registers data of addition, change, deletion, and the like of a storage domain ID in the corresponding respective tables in response to an input from the administrator.

Next, the storage management program 110a checks the operation state of the ports 204. More specifically, the storage management program 110a judges whether or not there is an overload (high-load) port 204 out of data indicating utilization rates of the ports 204 in the differential data acquired in S1202. If there is data exceeding a "threshold value" set in advance in the utilization rates acquired in S1202, the storage management program 110a proceeds to S1206. On the other hand, if there is no data exceeding the "threshold value" set in advance in the utilization rate acquired in S1202, the storage management program 110a proceeds to S1207 (S1205).

In S1206, the storage management program 110a updates the entry 505 of the port 204 with the utilization rate exceeding the "threshold value" in the port management table 112 to "overload" (S1206). In this way, the port 204, for which "overload" is stored in the entry 505 of the port management table 112, is excluded from candidates of search in the port allocation processing to be described later.

On the other hand, even if "overload" is stored in the port management table 112 for the port 204, if the acquired utilization rate for the port 204 is lower than the predetermined "threshold value", the storage management program 110a returns the corresponding entry 505 to "normal" (S1207 and S1208). Moreover, in S1207 and S1208, if there is an unregistered and low-load port 204, the storage management program 110a registers the port 204 in the port management table 112.

Note that, in this embodiment, the storage management program 110a repeats the processing of S1202 to S1208 after waiting for a predetermined time. Note that here, the storage management program 110a repeats the processing every fixed time. However, if a configuration or an operation state has been changed, a delay in the update of information may be prevented by applying a trigger from the storage management program 110b to the storage management program 110a.

Next, the "discovery processing (processing B1102)" will be described in detail with reference to FIG. 13.

Figure 13:
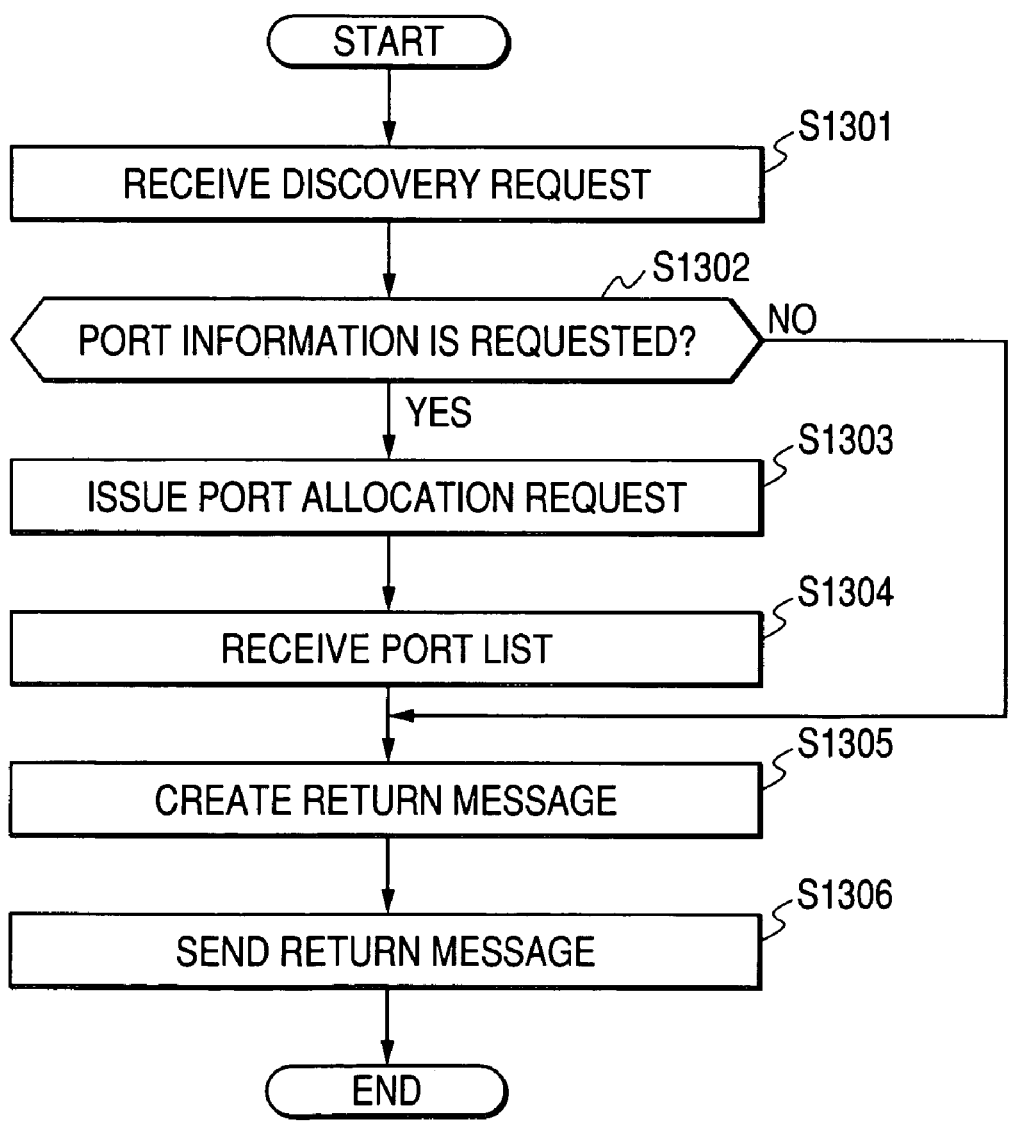
FIG. 13 is a flow diagram showing the flow of discovery processing that is performed by a management computer 102.

FIG. 13 is a diagram which will be used for explaining the flow of the discovery processing that is performed by the management computer according to this embodiment. Note that the CPU 10 of the management computer 103 executes respective programs (the storage management program 110a and the name management program 114), whereby the following processing is realized. However, in the following explanation, for simplification of the explanation, the respective programs (the storage management program 110a and the name management program 114) are assumed to be subjects of the operation.

The name management program 114 receives a request for discovery (in "iSNS", "DevAttrQry") from an apparatus in the SAN 104, for example, the host computer 101 (S1301).

After receiving the request for discovery, the name management program 114 analyzes the contents of the request and judges whether or not the request is related to the port allocation processing (S1302). If the request is not related to the port allocation processing, the name management program 114 proceeds to processing of S1305 and S1306. On the other hand, if the request is related to the port allocation processing, the name management program 114 proceeds to S1303.

In S1305 and S1306, the name management program 114 creates a return message with reference to the device management table 111 and the port management table 112 in usual processing of the name management processing (i.e., iSNS) and, then, it sends the return message to the host computer 101 that has requested the discovery.

Next, the processing in S1303, to which the name management program 114 proceeds when the name management program 114 has received the request for the port allocation processing in S1302, will be described.

In S1303, the name management program 114 requests the storage management program 110a to perform the port allocation processing (processing C1103 shown in FIG. 11). In requesting the port allocation processing (processing C1103), the name management program 114 adds information on the host computer 101 that has requested the processing ("iSCSI Name" in the entry 802 of the name management table 115, "DD" in the entry 803, "Portal IP Address: Port" in the entry 806, etc.) and information on an iSCSI node that is requested to be searched ("iSCSI Name" in the entry 503 of the port management table 112)(S1303).

On the other hand, the storage management program 110a receives the request for the port allocation processing. Then, the storage management program 110a executes the port allocation processing and returns a result of the execution to the name management program 114 (the port allocation processing will be explained with reference to FIG. 14 later). The name management program 114 receives the result of the execution sent by the storage management program 110a (S1304).

Thereafter, the name management program 114 updates the name management table 115 on the basis of the received contents, creates a return message, and sends the return message to the request source host computer 101 (S1304 to S1306).

In this embodiment, in the processing of S1304 to S1306, the name management program 114 stores port information on the devices 105 in the name management table 115 (iSCSI Name 802, DD 803, Portal IP Address: Port 806, etc.).

Next, the "port allocation processing (processing C1103) will be described in detail with reference to FIG. 14.

Figure 14:
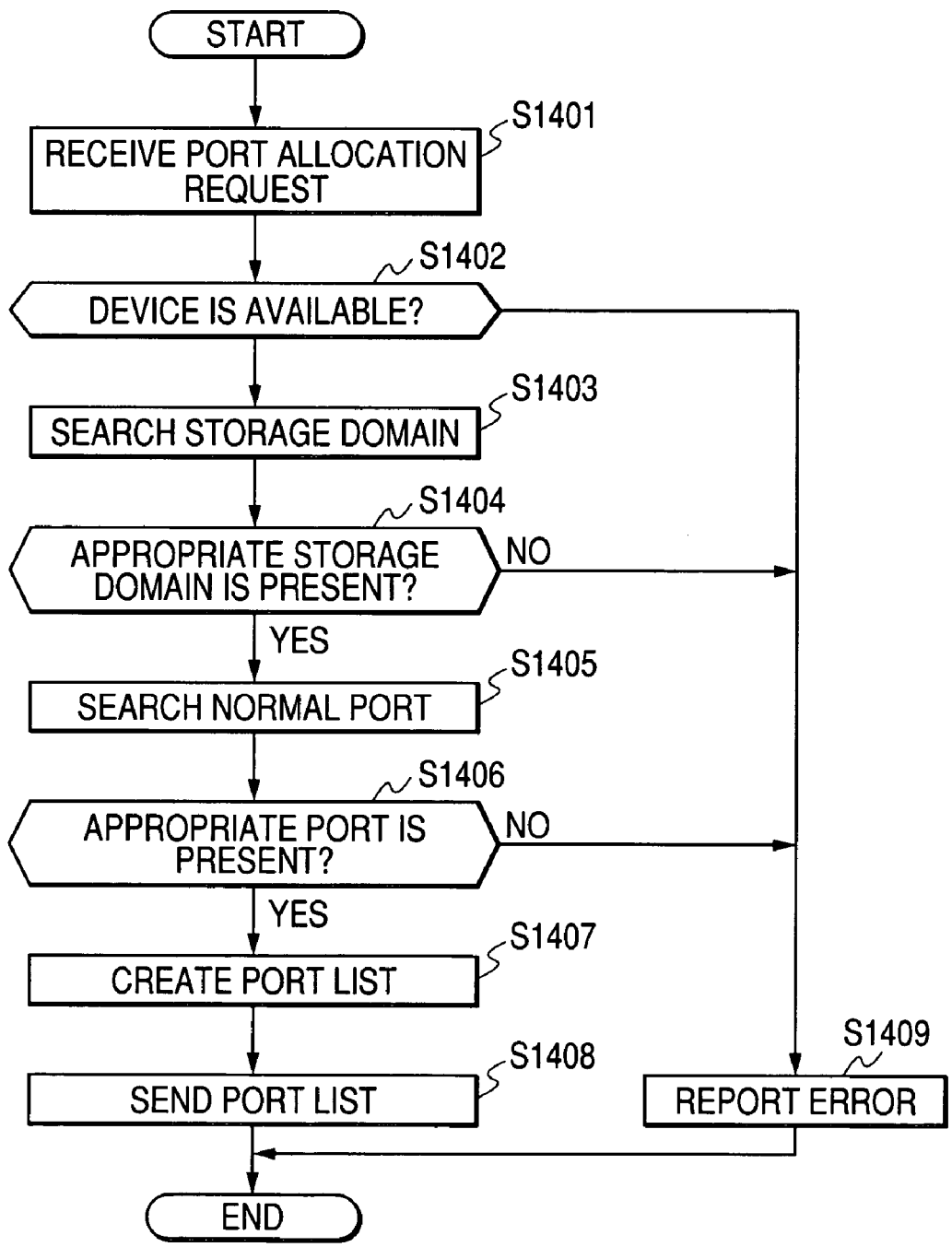
FIG. 14 is a flow diagram showing the flow of port allocation processing that is performed by the management computer 102.

FIG. 14 is a diagram which will be used for explaining the flow of the port allocation processing that is performed by the management computer 102 according to this embodiment. Note that the CPU 10 of the management computer 103 executes respective programs (the storage management program 110a and the name management program 114), whereby the following processing is realized. However, in the following explanation, for simplification of the explanation, the respective programs (the storage management program 110a and the name management program 114) are assumed to be subjects of the operation.

The storage management program 110a receives a request for the port allocation processing sent by the name management program 114 (S1401).

The storage management program 110a refers to the device management table 111 to judge whether or not the requested logic device 105 (i.e., iSCSI node) is available (S1402). If it is judged that the logic device 105 is available, the storage management program 110a proceeds to S1403.

On the other hand, if it is judged that the logic device 105 cannot be used, the storage management program 110a proceeds to S1409. Note that, the case in which the logic device 105 cannot be used includes a case in which the logic device 105 corresponding to the device management table 111 is not present and a case in which the "state" stored in the corresponding entry 506 is "blocked".

If it is judged in S1402 that the logic device 105 is available, the storage management program 110a searches the available storage domain 301 on the basis of the judged logic device 105 and information on the request source host computer 101, which is given when the name management program 114 requested the processing (S1403). More specifically, the storage management program 110a refers to the host management table 116 on the basis of a "device ID (i.e., iSCSI Name)" of the host computer 101 and a device ID of the logic device and acquires a storage domain ID to which the request source host computer 101 and the requested logic device belong.

If the appropriate storage domain 301 is present as a result of the search, the storage management program 110a can obtain one or more storage domain IDs. If the appropriate storage domain 301 is not present, the storage management program 110a sets a default storage domain ID. In the case in which the appropriate storage domain could be acquired and in the case in which the default storage domain ID could be set, the storage management program 110a proceeds to S1405. On the other hand, in the case in which the setting of the default storage domain ID is impossible, the storage management program 110a proceeds to S1409 (S1404).

In S1405, the storage management program 110a executes search processing for the obtained one or more storage domain IDs. The storage management program 110a searches through the port management table 112 to find the port 204 with a state of "normal" out of the ports 204 belonging to the respective storage domains 301 (S1405).

If a "normal" port 204 is not present in any of the storage domains 301, the storage management program 110a proceeds to S1409. If a "normal" port 204 is present, the storage management program 110a proceeds to s1407 (S1406).

In S1407, the storage management program 110a creates a port list. More specifically, in the case in which a "normal" port 204 is present in the plural storage domains 301 or in the case in which plural ports are allocated to the storage domain 301, the storage management program 110a calculates the available throughput and the like from the number of "normal" ports 204 and the port utilization rate and selects a combination of the storage domains 301 and the ports 204 (group of the ports) that minimizes the load. When the group of the ports 204 is selected, the storage management program 110a creates a port list from the selected group of ports (S1407).

The storage management program 110a sends the created port list to the name management program 114 to end the processing (S1408).

If the storage management program 110a proceeds to S1409 in S1402, S1404, and S1406, the storage management program 110a returns data indicating an error to the name management program 114 to end the processing.

Note that, in this embodiment, the order of the ports in the port list is not specifically limited. For example, the ports in the port list may be arranged in an order of search and output. However, since the port at the top of the port list is usually used first, it is advisable to arrange the port 204 with a highest priority at the top of the port list, and the port 204 with a lowest priority is arranged at the end of the port list. Note that information on performance and paths of the ports 204 may be used for the priorities of the ports in the port list.

For example, in the case in which priorities for port selection is selected according to performance, a port having the lowest utilization rate or having a margin in throughput (i.e., having large amount of unused throughput) in a result of the selection is given a highest priority.

In addition, in the case in which the closest port 204 is allocated on the basis of an address, for example, in the case of an IP network, sub-networks of IP addresses may be compared. A command for tracing a network path (in the Unix environment, there is a traceroute command) may be used to determine priorities taking into account paths from the host computer 101 (e.g., a priority for the port 204 with a short path from the host computer 101 is set high).

Moreover, as a method of determining priorities of the ports in the port list, a round robin method is possible. The storage management program 110a maintains priorities for the respective ports 204 and creates a port list with the port 204 having the highest priority at the top of the list. After sending the port list, the storage management program 110a changes the priority of the top port 204 to the lowest and sequentially moves up the priorities for the other ports 204. This makes it possible to access all the ports 204 uniformly with simple processing.

Next, a second embodiment of the present invention will be explained. In the second embodiment, in addition to management for the storage domain 301 in the first embodiment, management for the storage subsystem is performed with the addition of topology management for the SAN 104. Note that, in the explanation of the second embodiment, components which are the same as those in the first embodiment are denoted by the same reference numerals and signs.

Figure 15:
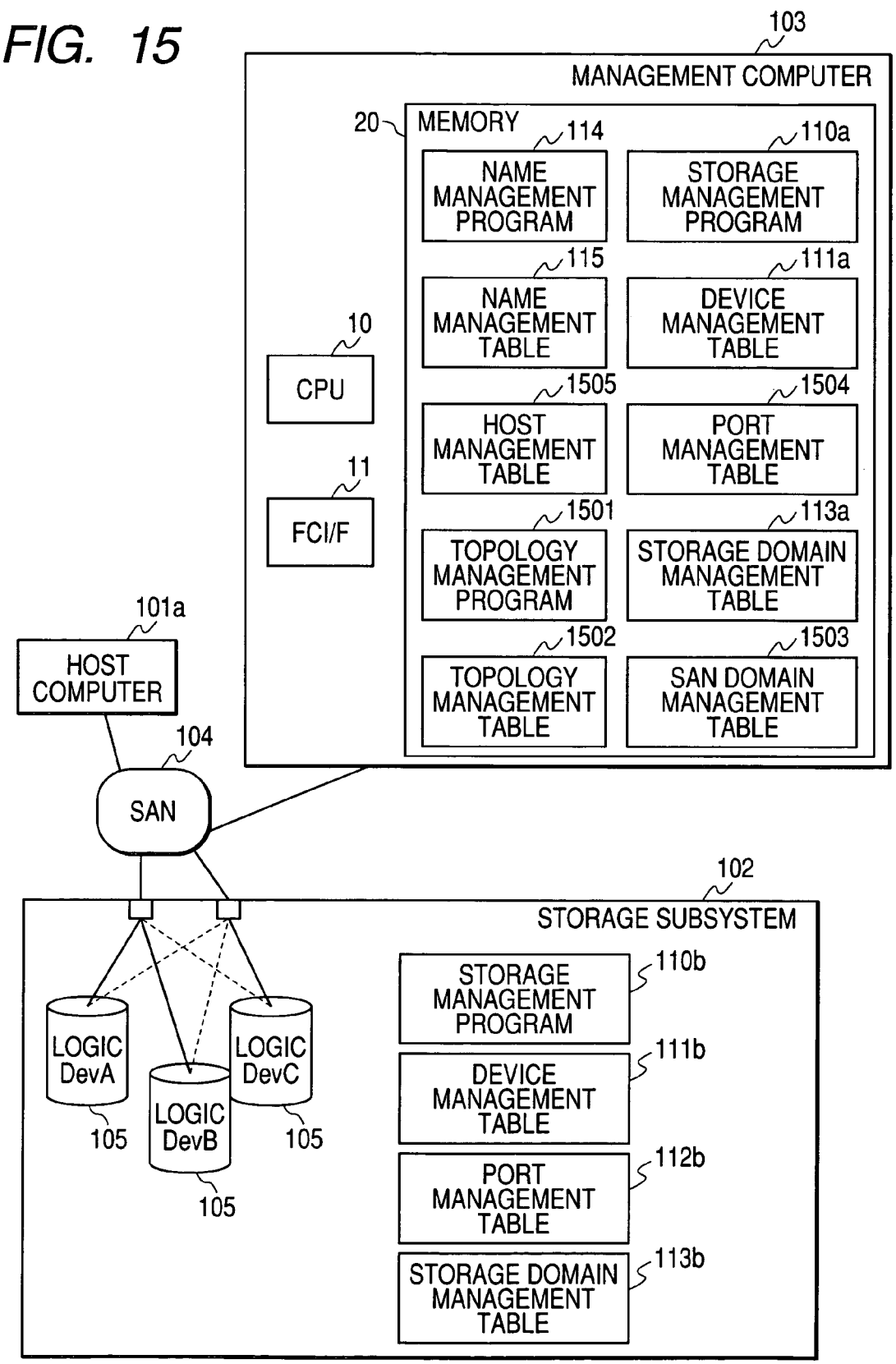
FIG. 15 is a block diagram showing an example of an information processing system according to a second embodiment of the present invention.

FIG. 15 is a block diagram showing an example of the system configuration of an information processing system according to the second embodiment.

As shown in the figure, the information processing system according to the second embodiment has the same configuration as the information processing system according to the first embodiment except for the face that a structure of the management computer 103 is different. In the following explanation, this difference will be mainly explained.

More specifically, in the management computer 103 according to the second embodiment, a topology management program 1501, the topology management table 1502, and the SAN domain management table 1503 are added to the management computer 103 according to the first embodiment. In addition, in the management computer 103 according to the second embodiment, a port management table 1504 and a host management table 1505 are provided instead of the management table 112 and the host management table 116 included in the management computer 103 according to the first embodiment.

In the port management table 1504 and the host management table 1505, information on a SAN domain is added to the management table 112 and the host management table 116 that were explained in connection with the first embodiment.

The topology management program 1501 is a program that manages the topology of the SAN 104 and the security of Zoning, VLAN (Virtual LAN), VPN (Virtual Private Network), and the like on a network. The information on topology is stored in the topology management table 1502.

In the storage management program 110a according to the second embodiment, a program for managing topology information is added to the storage management program 110a according to the first embodiment.

The CPU 10 of the management computer 103 executes the topology management program 150 to store topology information in a predetermined area in the memory 20 every time topology concerning the SAN 104 is changed. In the case in which the topology information is stored in a predetermined area in the memory 20, the CPU 10 executes the storage management program 110a to read out the topology information stored in the memory 20 and perform processing for updating the SAN domain management table 1503 and the port management table 1504 (or registering the information in the SAN domain management table 1503 and the port management table 1504). In this way, the CPU 10 executes the storage management program 110a and the topology management program 1501 in association with each other, whereby, every time the topology concerning the SAN 104 is changed, the contents of the change can be reflected on the SAN domain management table 1503 and the port management table 1504.

In this way, in the second embodiment, the topology management for the SAN 104 is combined with the management for the storage domain 301. Such a configuration makes efficient path management possible in addition to the effects of the first embodiment. More specifically, this makes association with a security function or the like according to Zoning, VLAN (Virtual LAN), and VPN (Virtual Private Network) possible.

Figure 16:
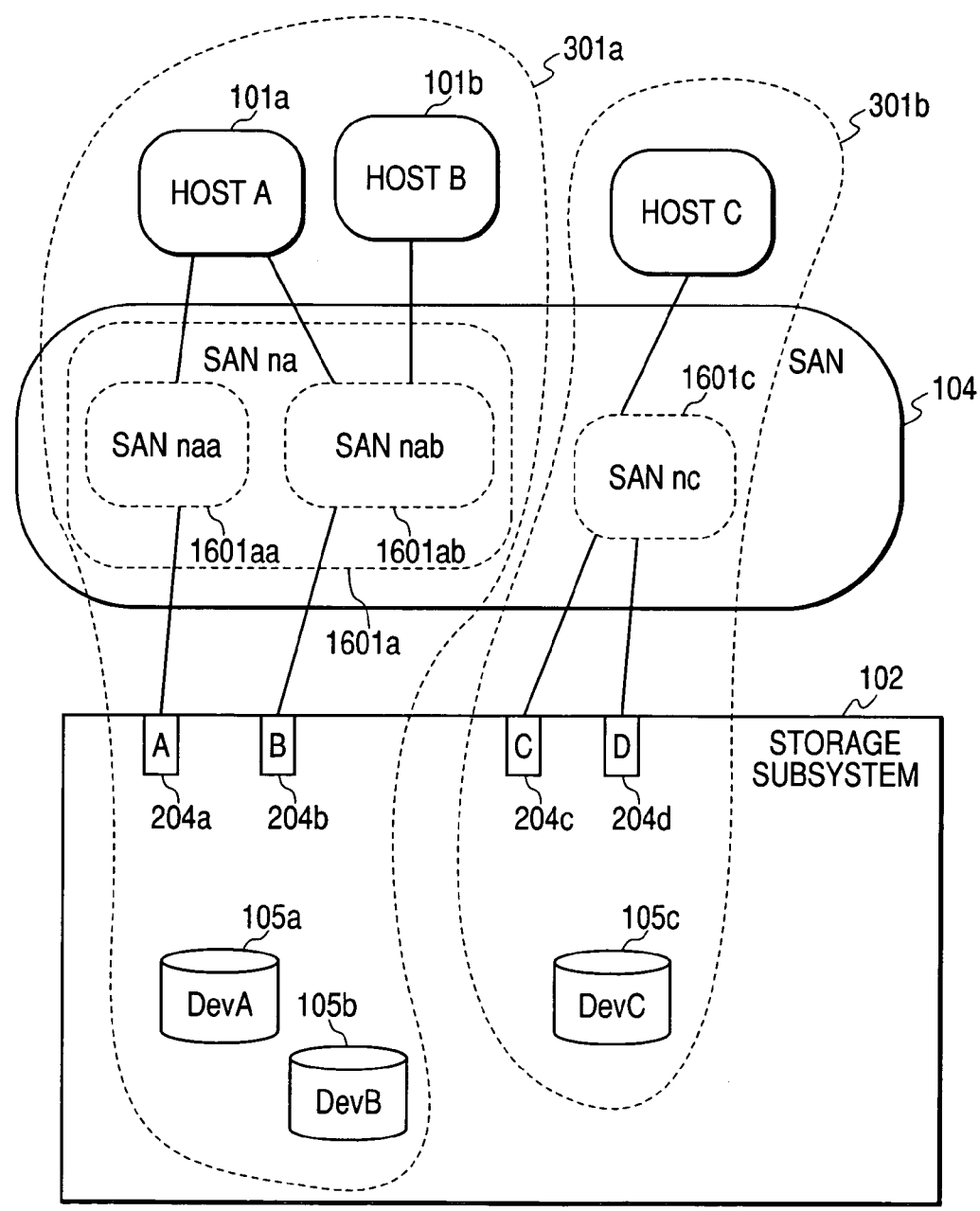
FIG. 16 is a diagram illustrating a SAN domain.

FIG. 16 is a diagram which will be used for explaining a SAN domain that is a management unit for the information processing system according to the second embodiment.

SAN domains 1601, as shown in FIG. 16, are created by the CPU 10 of the management computer 103. More specifically, the CPU 10 executes the storage management program 110a to read out "information on topology and security of the SAN 104" stored in the predetermined area in the memory 20, as described above. The CPU 10 executes the storage management program 110a and uses the read-out "information on topology and security" to set the SAN domains 1601.

That is, the CPU 10 executes the storage management program 110a to set a group of ports, which are accessible in the SAN 104, as SAN domains on the basis of the security information. Next, the CPU 10 executes the storage management program 110a to classify the SAN domains 1601 in an identical security attribute in SAN domains 1601a to 1601n with respect to topology.

In the example shown in FIG. 16, the CPU 10 executes the storage management program 110a to create the SAN domain 1601a first on the basis of a security attribute. Next, the CPU 10 executes the storage management program 110a to divide the created SAN domain 1601a into SAN domains 1601aa and 1601ab on the basis of the acquired topology information.

In this example, the host computer 101a belongs to both the SAN domains 1601aa and 1601ab, and the host computer 101b belongs to only the SAN domain 1601ab. In other words, although the logic device 105a and the logic device 105b are accessible from the host computer 101b, the access is possible only through the port 204b. On the other hand, the logic device 105a and the logic device 105b are accessible from the host computer 101a from both the ports 204a and 204b.

In addition, the example shown in the figure indicates that the SAN domains 1601aa and 1601ab belong to the storage domain 301a, and the SAN domain 1601c belongs to the storage domain 301b.

Next, data structures of the SAN domain management table 1503, the port management table 1504, and the host management table 1505, which are included in the information processing system according to the second embodiment, will be explained with reference to FIGS. 17 to 19.

FIG. 17 is a diagram showing an example of the data structure of the SAN domain management table 1503 according to the second embodiment.

The SAN domain management table 1503 includes an entry 1701 in which a "SAN domain ID" serving as an identifier for a SAN domain is stored, an entry 1702 in which a "SAN domain name" serving as a name of the SAN domain is stored, and an entry 1703 in which "attribute information" indicating attributes of the SAN domain is stored. The "SAN domain name" and "attribute data" are stored in the entries 1702 and 1703 in association with the "SAN domain ID" stored in the entry 1701.

In the entry of a top "row" in the SAN domain management table 1503 shown in FIG. 17, data with the "SAN domain ID" of "na", the "SAN domain name" of "SAN domain A", and the "attribute data" of "VLAN-A" is stored.

The CPU 10 of the management computer 10 executes the storage management program 110a to thereby manage the data stored in the SAN domain management table 1503.

FIG. 18 is a diagram showing an example of the data structure of the port management table 1504 according to the second embodiment.

In the management port table 1504, an entry 1801, in which a "SAN domain ID" serving as an identifier for a SAN domain, is added to the port management table 112 shown in FIG. 5.

The CPU 10 of the management computer 10 executes the storage management program 110a to thereby manage data stored in the port management table 1504. The CPU 10 executes the storage management program 110a to thereby read out the topology information (information on topology and security of the SAN 104) stored in the predetermined area in the memory 20. The CPU 10 executes the storage management program 110a to analyze the read-out information and associate SAN domains with respective ports. In addition, the CPU 10 executes the storage management program 110a to store the associated SAN domains in the corresponding entry 1801.

FIG. 19 is a diagram showing an example of the data structure of the host management table 1505 according to the second embodiment. In the host management table 1505, an entry 1901, in which a "SAN domain ID" serving as an identifier for a SAN domain is stored, is added to the host management table 116 shown in FIG. 7.

The CPU 10 of the management computer 103 executes the storage management program 110a to thereby manage data stored in the host management table 1505. The CPU 10 executes the storage management program 110a to thereby read out the topology information (information on topology and security of the SAN 104) stored in the predetermined area in the memory 20. The CPU 10 executes the storage management program 110a to analyze the acquired information and associate SAN domains with respective ports. In addition, the CPU 10 executes the storage management program 110a to store the associated SAN domains in the corresponding entry 1901.

Figure 20:
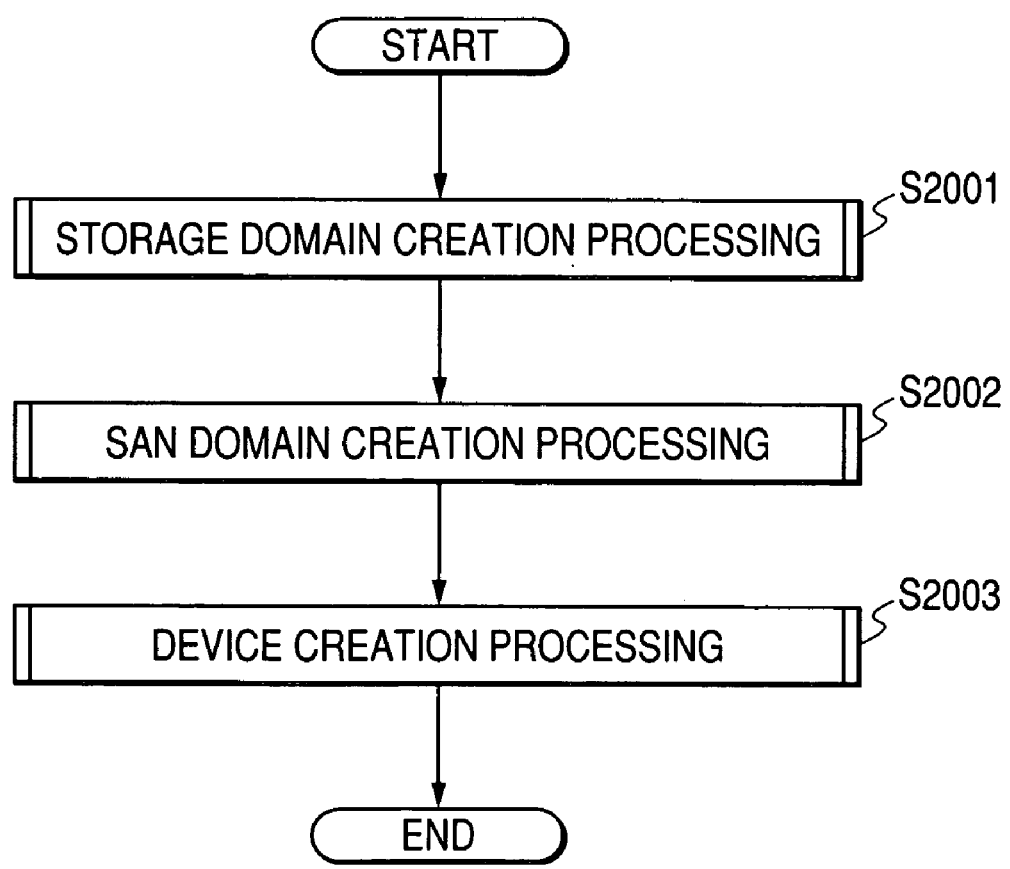
FIG. 20 is a flow diagram showing the flow of initial setting processing that is performed by the information processing system according to the second embodiment.

FIG. 20 is a diagram which will be used for explaining the flow of initial setting processing that is performed by the information processing system according to the second embodiment. Note that the initial setting processing, which is performed by the information processing system according to the second embodiment, is basically the same as the initial setting processing according to the first embodiment as explained with reference to FIG. 9. Thus, in the following explanation, the differences will mainly be explained.

The information processing system according to the second embodiment performs the same processing as S901 in FIG. 9 to receive a setting for the storage domains 301 from an administrator (S2001).

Subsequently, in the second embodiment, the CPU 10 of the management computer 103 executes the storage management program 110a to set the SAN domain IDs 1801 in the port management table 1504 (S2002). This embodiment is not specifically limited to a specific procedure for the setting of the SAN domain IDs 1801 in the port management table 1504, which the CPU 10 performs by executing the storage management program 110a. For example, the CPU 10 may receive setting information for SAN domains inputted by the administrator and store the received setting information for the SAN domains in the port management table 1504.

Thereafter, the CPU 10 of the management computer 103 performs the same processing as S902 in FIG. 9 (S2003).

Next, device creation processing, which is performed by the information processing system according to the second embodiment, will be explained. The device creation processing, which is performed by the information processing system according to the second embodiment, is the same as device creation processing according to the first embodiment shown in FIG. 10.

Next, port allocation processing will be explained. The port allocation processing, which is performed by the information processing system according to the second embodiment, is the same as the port allocation processing according to the first embodiment, except for the port allocation processing (processing C) shown in FIG. 14. In other words, in the second embodiment, processing which is the same as the processing according to the first embodiment shown in FIGS. 1 to 13 is performed. Thus, the port allocation processing which is different from the port allocation processing according to the first embodiment will be explained with reference to FIG. 21.

Figure 21:
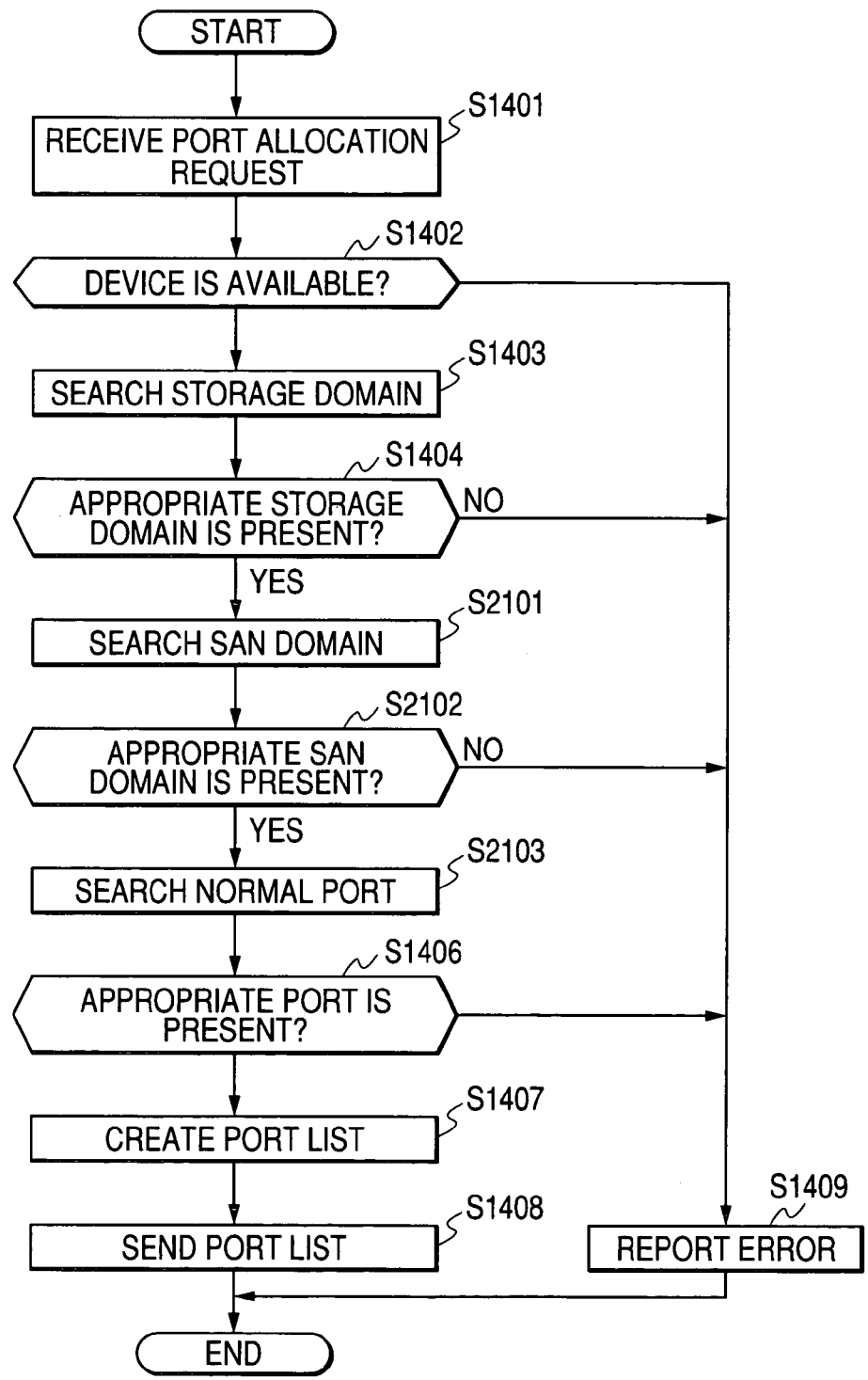
FIG. 21 is a flow diagram showing the flow of port allocation processing that is performed by a management computer according to the second embodiment.

FIG. 21 is a diagram which will be used for explaining the flow of the port allocation processing that is performed by the management computer 103 according to this embodiment. Note that the CPU 10 of the management computer 103 executes the respective programs (the storage management program 110a, the name management program 114, and the topology management program 1501), or the CPU 202 of the storage subsystem 102 executes the storage management program 110a, whereby the following processing is realized. However, in the following explanation, for simplification of the explanation, the respective programs (the storage management program 110a, the name management program 114, and the topology management program 1501) are assumed to be subjects of the operation.

The storage management program 110a according to the second embodiment performs processing that is basically the same as the processing shown in FIG. 14. However, the processing is different from the processing shown in FIG. 14 in that processing for the SAN domains 1601 is added after S1404 in FIG. 14. In the following explanation, features that are different from the processing in FIG. 14 will be mainly explained.

The storage management program 110a performs the same processing as S1401 to S1404. Thereafter, the storage management program 110a proceeds to processing of S2101 in which the storage management program 110a performs processing for the SAN domains 1601.

In S2101, the storage management program 110a also searches the SAN domain 1601 in the same procedure as the search for the storage domain 301. The storage management program 110a searches the host management table 1505 and obtains the SAN domain 1601 to which the request source host computer 101 belongs. In this case, if no SAN domain 106 is obtained, the storage management program 110a proceeds to S1409. On the other hand, if one or more SAN domains 1601 is obtained, the storage management program 110a proceeds to S2103 (S2102).

In S2103, the storage management program 110a searches through the port management table 1504 to acquire the port 204 with the state 505 of "normal" among the ports 204 belonging to both the storage domains 301 obtained in S1403 and the SAN domain 1601 obtained in S2101, and proceeds to processing of S1407.

On the other hand, if the port 204 with the state 505 of "normal" among the ports belonging to both the storage domains 301 obtained in S1403 and the SAN domain 1601 obtained in S2101 could not be obtained as a result of the search, the storage management program 110a proceeds to S1409.

Note that, since processing in S1407 to S1409 is the same as the processing shown in FIG. 14, a repeated description of this processing will be omitted.

In this way, in the second embodiment, the management for the storage domains 301 and the topology management for the SAN 104 are combined. Such a configuration makes efficient path management possible in addition to the effects of the first embodiment. More specifically, this makes association with a security function or the like according to Zoning, VLAN (Virtual LAN), and VPN (Virtual Private Network) possible. Here, association means, for example, dividing a SAN such that SAN domains are identical with domains in the VLAN.

Next, a third embodiment of the present invention will be explained. The third embodiment has the same configuration as the first and the second embodiments except that the procedure for port allocation processing is different. Note that the third embodiment can be applied to both a configuration in which storage domains are set to manage the storage subsystem 102 as in the first embodiment and a configuration in which the storage subsystem 102 is managed using storage domains and SAN domains as in the second embodiment. In the following explanation, an example in which only storage domains are set to manage the storage subsystem 102 will be explained. In addition, in the explanation of the third embodiment, components which are the same as those in the first embodiment are denoted by the same reference numerals and signs.

The configuration of the information processing system according to the third embodiment is the same as the configuration of the first embodiment shown in FIGS. 1 and 2. However, the third embodiment is different from the first embodiment in the structures of the name management program 114 and the storage management program 110.

The storage domain 301, which is a management unit for the storage subsystem 102 according to the third embodiment, is the same as the storage domain 301 shown in FIG. 3.

Figure 22:
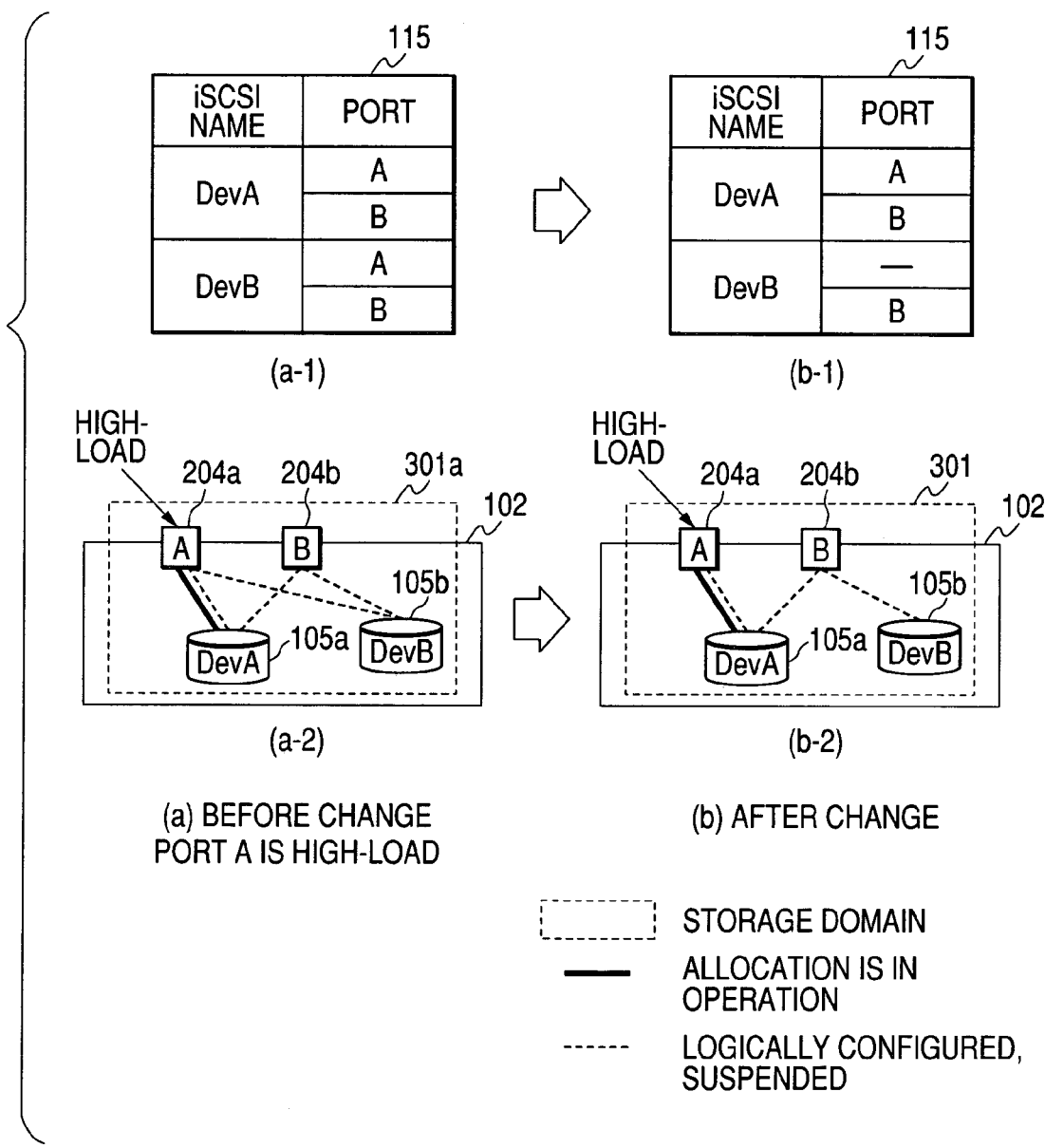
FIG. 22 is a diagram illustrating port allocation processing that is performed by a management computer 103 according to a third embodiment of the present invention.

FIG. 22 is a diagram which will be used for explaining the port allocation processing that is performed by the management computer 103 according to the third embodiment. Note that the CPU 10 of the management computer 103 executes the respective programs (the storage management program 110a and the name management program 114), whereby the port allocation processing which will be explained below is realized. However, in the following explanation, for simplification of the explanation, the respective programs (the storage management program 110a and the name management program 114) are assumed to be subjects of the operation.

In FIG. 22, a diagram illustrating the a connection relation between the ports 204 and the logic devices 105 included in the storage subsystem 102 before changing the name management table 115 is shown in (a), and a diagram illustrating the connection relation between the ports 204 and the logic devices 105 included in the storage subsystem 102 after changing the name management table 115 is shown in (b).

In addition, (a-1) and (b-1) in FIG. 22 show the name management tables 115. Note that, in the name management tables 115 in (a-1) and (b-1), only data (the data of the entry 802 and the entry 805 shown in FIG. 8) necessary for explanation of the port allocation processing, which is performed by the management computer 103 according to the third embodiment, is extracted and illustrated (the name management table 115).

Further, in (a-2) and (b-2) in FIG. 22, images illustrating the connection relation between the ports 204 and the logic devices 105 included in the storage subsystem 102 are shown.

The name management table 115 shown in (a-1) represents a state in which a "logic device A" is connectable to the port 204a and the port 204b. In addition, the name management table 115 shown in (b-1) represents a state in which a "logic device B" is connectable to the port 204a and the port 204b.

In (a-2), the logic devices 105A and 105B and the ports 204a and 204b are allocated to the storage domain 301a. Broken lines in the figure indicate that the logic devices 105 and the ports 204 are connectable. In addition, (a-2) indicates that the device 105A is used through the port 204a, and the port 204a is in a state of "high-load". In the information processing system according to the third embodiment, as shown in (a-2), in the case in which the "port 204a" is in a high load state, new connection to the "port 204a" is limited.

The storage management program 110a according to the third embodiment monitors the states of the ports 204 of the storage subsystem 102. If it is judged, as a result of monitoring, that the ports 204 are "overloaded", the storage management program 110a performs connection control such that new connection to the "port 204a" is not performed. More specifically, the storage management program 110a informs the storage subsystem 102 that use of the port 204a is to be stopped (or use of the port 204a is to be limited). When a port list is created (or after the port list is created), the name management program 114 prevents the port 204a from being included in the list.

However, in performing connection control, the storage management program 110a secures at least one access path to a logic devices 105. In the case in which there is the logic device 105 having only one connection destination port 204, even if the connection destination port 204 is in the "overload" state, the storage management program 110a does not perform the connection control for the logic device 105. On the other hand, in the case in which a logic device 105 that is connectable to the "overload" port is also connectable to the ports 204, other than the overload port 204, the storage management program 110a controls connection to the logic device 105. More specifically, the storage management program 110a cancels a connectable relation between the logic device 105 and the "overload" port 204.

Note that, in the example shown in the figure, the device 105b has a connection path from the "port 204b" in addition to a connection path from the "port 204a". Thus, the connection path through the "port 204a" may be deleted. The storage management program 110a requests the name management program 114 to delete the "port 204a" from the connectable ports 204 of the device 105b. In this case, the storage management program 110a rejects an access request to the device 105b via the port 204a.

In response to this request, the name management program 114 changes the name management table 115 shown in (a-1) to the configuration shown in (b-1). In other words, the name management program 114 deletes data indicating the "port 204a" associated with the "device 105b" in the name management table 115. As a result, the connection relation between the ports 204 and the logic device 105 is as shown in (b-2).

In this way, in the third embodiment, in the storage domains 301, the ports 204 and the logic devices 105 are further associated with each other, and the connection relation between the ports 204 and the logic devices 105 is managed. The connection relation between the associated ports 204 and the logic devices 105 is changed according to the loads of the ports 204.

That is, in the third embodiment, connection to the ports 204 is controlled according to a load state of the ports. This makes it possible to avoid access to the port 204 in a high-load state, and so the utilization rate of the entire system can be improved. Note that the data structures of the respective tables (the name management table 115, the host management table 116, the device management table 111, the port management table 112, and the storage domain management table 113) in the third embodiment are the same as those shown in FIGS. 4 to 8.

In addition, initial setting processing and logic device creation processing, which are performed by the information processing system according to the third embodiment, are the same as those shown in FIGS. 9 and 10.

Figure 23:
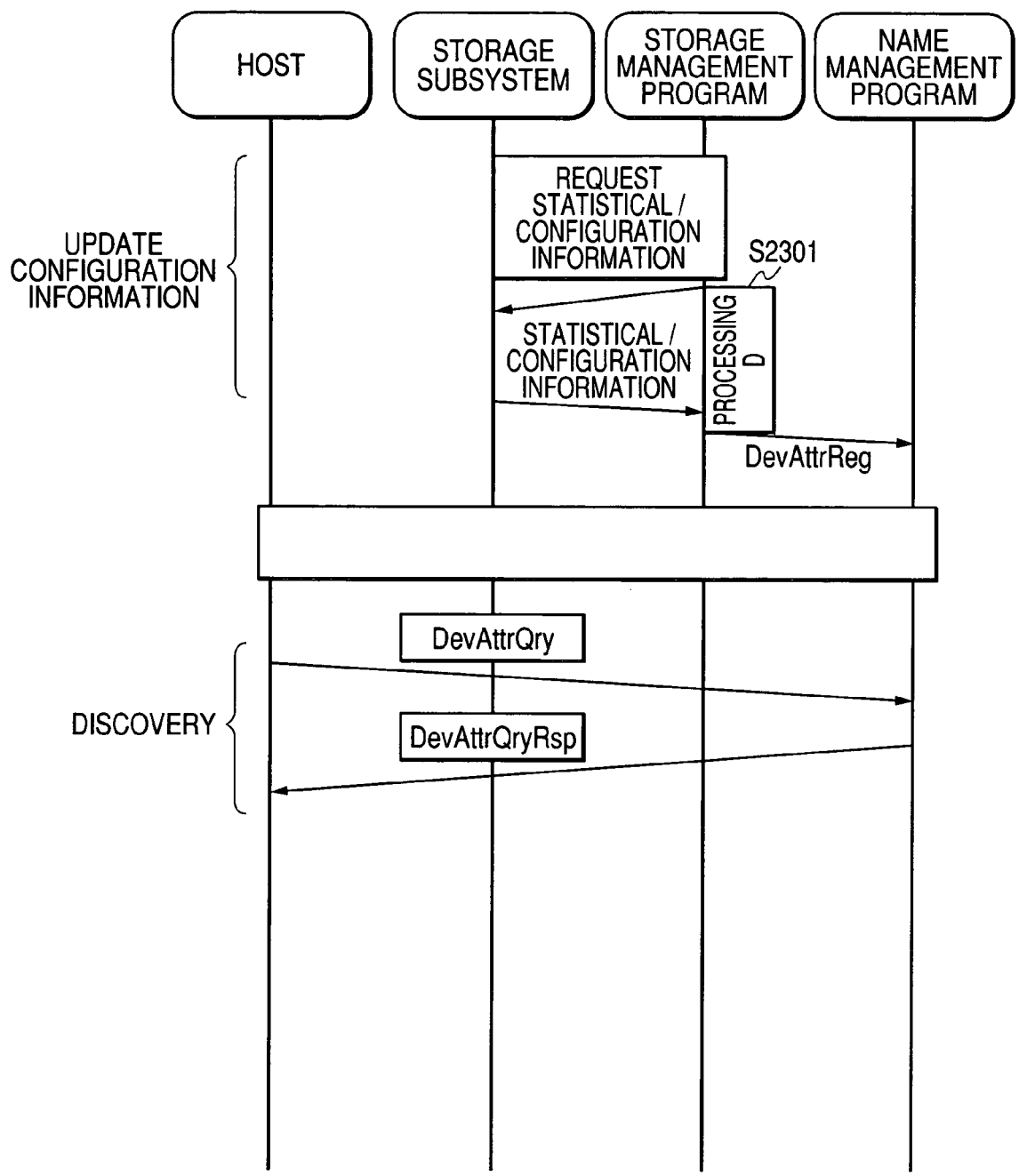
FIG. 23 is a diagram illustrating the flow of port allocation processing that is performed by an information processing system according to the third embodiment.

Next, port allocation processing of the information processing system according to the third embodiment will be explained with reference to FIG. 23. Note that the CPU 10 of the management computer 103 executes respective programs (the storage management program 110a and the name management program 114), or the CPU 20 of the storage subsystem 102 executes the storage management program 110b, whereby the following processing is realized. However, in the following explanation, for simplification of the explanation, the respective programs (the storage management program 110a, the storage management program 110b, and the name management program 114) are assumed to be subjects of the operation.

In performing configuration information update processing, the storage management program 110a of the management computer 103 inquires as to configuration information from the storage management program 110b of the storage subsystem 102 under the control of the storage management program 110a. The storage management program 110a acquires as to configuration information that is sent by the storage management program 110b in response to the inquiry.

In the case in which a notice of change for a configuration to the name management program 114 is necessary in the case of a change in configuration, detection of a high-load port, a shift from high-load to low-load, or the like, the storage management program 110a issues a request for a registration change for configuration information to the name management program 114 (processing D2301).

The name management program 114 applies the same processing as the discovery request shown in FIG. 11 to a discovery request from the host 101.

Figure 24:
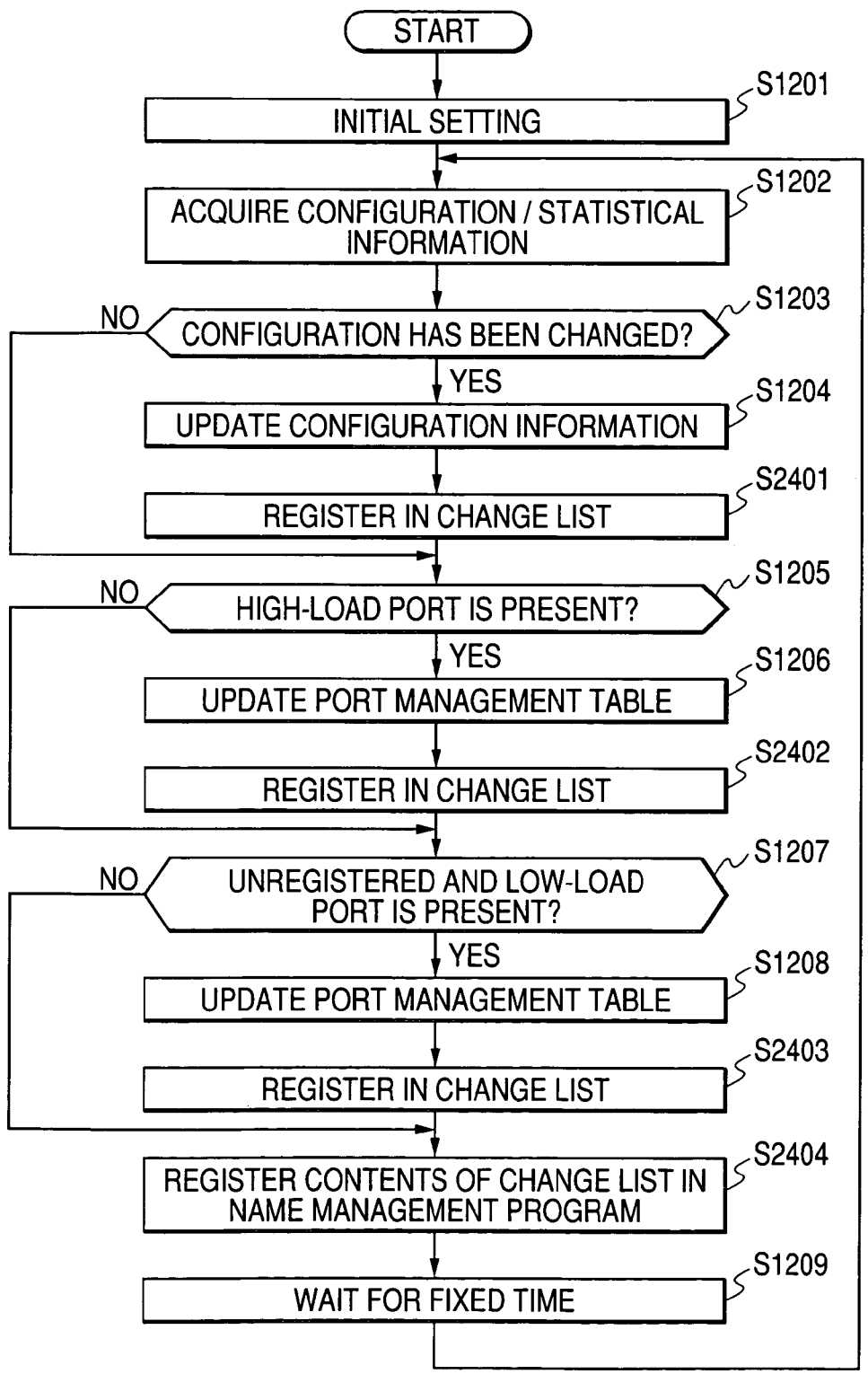
FIG. 24 is a flow diagram showing the flow of configuration update processing that is performed by the information processing system according to the third embodiment.

FIG. 24 is a diagram which will be used for explaining the flow of configuration update processing that is performed by the information processing system according to this embodiment. Note that the CPU 10 of the management computer 103 executes respective programs (the storage management program 110a and the name management program 114), or the CPU 202 of the storage subsystem 102 executes the storage management program 110b, whereby the following processing is realized. However, in the following explanation, for simplification of the explanation, the respective programs (the storage management program 110a, the storage management program 110b, and the name management program 114) are assumed to be subjects of the operation.

In the third embodiment, in the case in which the configuration of the storage subsystem 102 is updated, the storage management program 110a is required to inform the name management program 114 of the contents of the update and reflect the contents of the update on the name management table 115. In the third embodiment, a change list table (not shown) is provided in the memory 20 of the management computer 103. The storage management program 110a stores the contents of a change in the change list table. More specifically, the information processing system according to the third embodiment performs processing as described below.

The storage management program 110a performs the same processing as S1201 to S1204 in the processing of FIG. 12 and proceeds to processing in S2401. In S2401, the storage management program 110a stores data concerning the configuration change in the change list table, which is prepared in the memory 20 in advance, and proceeds to the processing in S1205. Thereafter, the storage management program 110a performs the same processing as S1205 and S1206 in the processing of FIG. 12 and proceeds to processing in S2402.

In S2402, the storage management program 110a stores data concerning an overload port in the change list and proceeds to the processing in S1207. Thereafter, the storage management program 110a performs the same processing as S1207 and S1208 in the processing of FIG. 12 and proceeds to processing in S2403.

In S2403, the storage management program 110a stores data concerning an unregistered and low-load port (or data concerning a port whose state has changed from high-load to low-load) in the change list and proceeds to processing in S2404.

In S2404, the storage management program 110a sends the contents of the change list to the name management program 114 and performs the same processing as S1209 in the processing of FIG. 12.

In this way, according to the third embodiment, the storage management program 110a of the management computer 103 monitors the states of the ports 204 of the storage subsystem 102 and performs connection control such that a new connection is not made to the "overload" port 204. Therefore, according to the third embodiment, in addition to the effects of the first embodiment, access to the port 204 in an overload state can be avoided, and the utilization rate of the entire system can be improved.

Next, a fourth embodiment of the present invention will be explained. The fourth embodiment has the same configuration as the first and the second embodiments except that the procedure for port allocation processing is different. The fourth embodiment of the present invention can be applied to both the configuration in which storage domains are set to manage the storage subsystem 102 as in the first embodiment, and the configuration in which storage domains and SAN domains are used to manage the storage subsystem 102 as in the second embodiment. In the following explanation, an example in which only storage domains are set to manage the storage subsystem 102 will be explained. In addition, in the explanation of the fourth embodiment, components that are the same as those in the first embodiment are denoted by the same reference numerals and signs.

Figure 25:
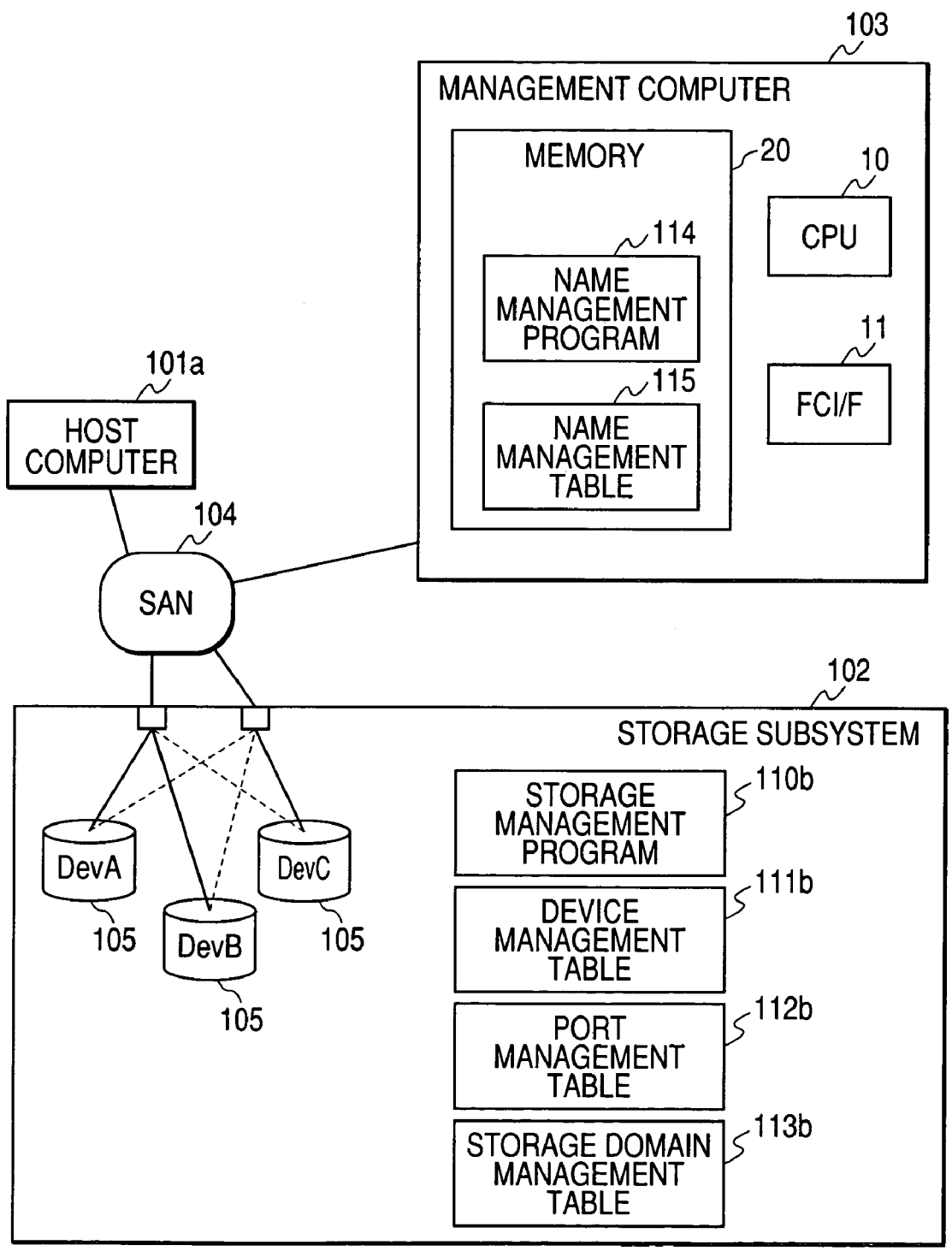
FIG. 25 is a block diagram showing an example of an information processing system according to a fourth embodiment of the present invention.

FIG. 25 is a block diagram showing an example of the system configuration of an information processing system according to the fourth embodiment.

The information processing system according to the fourth embodiment as shown in FIG. 25 is the same as the information processing system according to the first embodiment, for the fact except that the structure of the management computer 103 is different.

More specifically, at least the name management program 114 and the name management table 115 are stored in the memory 20 of the management computer 103. The CPU 202 of the storage subsystem 102 executes the storage management program 110b to send configuration information of the storage subsystem 102 to the management computer 103.

The CPU 10 of the management computer 103 executes the name management program 114 to receive the configuration information sent from the CPU 202 of the storage subsystem 102. The CPU 10 of the management computer 103 executes the name management program 114 to perform registration and to update data in the name management table 115 using the received configuration information.

The data structures of the respective tables (the name management table 115, the host management table 116, the device management table 111, the port management table 112, and the storage domain management table 113) in the fourth embodiment are the same as those shown in FIGS. 4 to 8.

In addition, the initial setting processing and logic device creation processing, which are performed by the information processing system according to the fourth embodiment, are the same as the processing shown in FIGS. 9 and 10.

Figure 26:
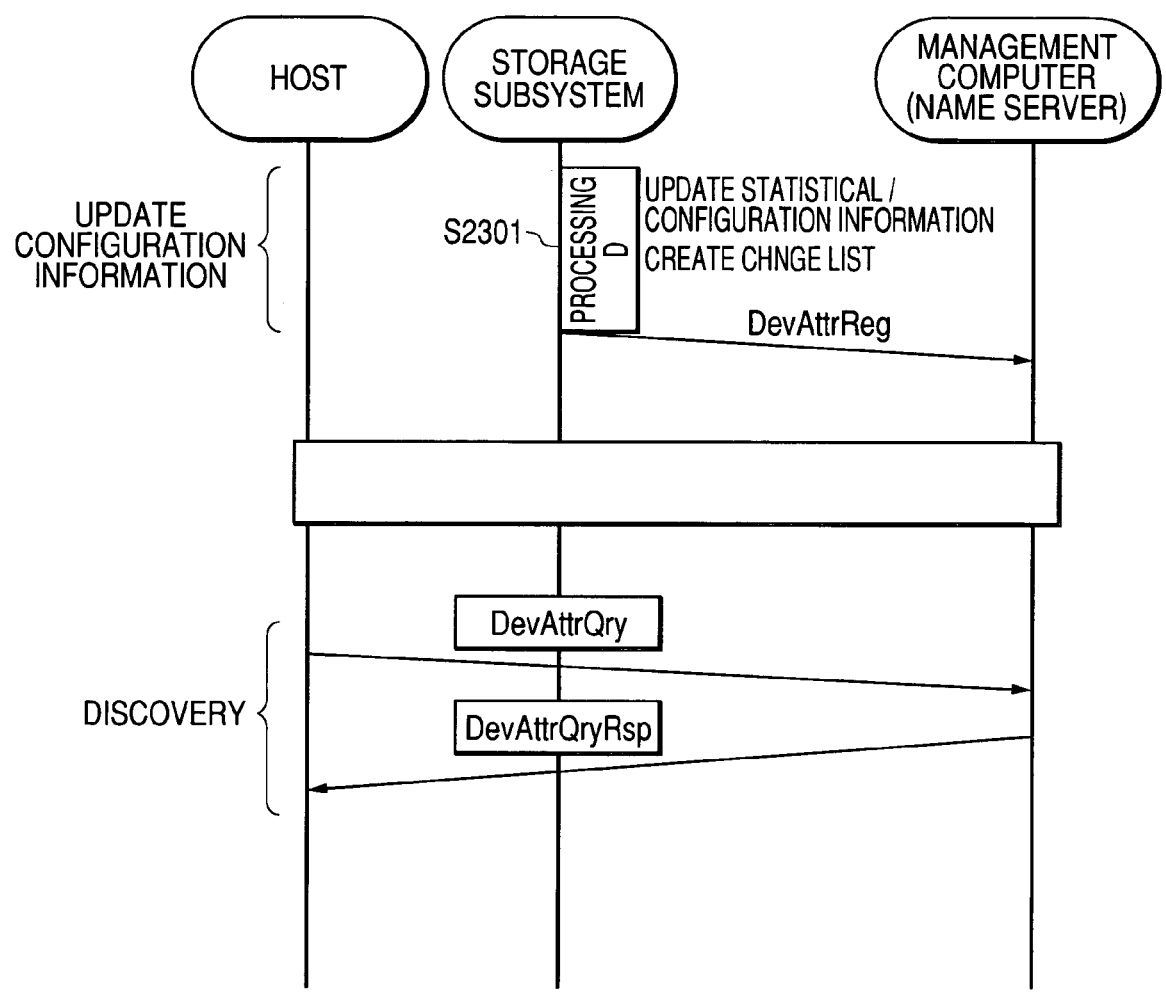
FIG. 26 is a diagram illustrating the flow of port allocation processing that is performed by the information processing system according to the fourth embodiment.

FIG. 26 is a diagram which will be used for explaining the flow of port allocation processing that is performed by the information processing system of the fourth embodiment. Note that the CPU 10 of the management computer 103 executes the name management program 114, or the CPU 202 of the storage subsystem 102 executes the storage management program 110b, whereby the following processing is realized. However, in the following explanation, for simplification of the explanation, the respective programs (the storage management program 110b and the name management program 114) are assumed to be subjects of the operation.

The fourth embodiment adopts a form in which the storage management program 110b of the storage subsystem 102 directly communicates with the name management program 114. It is unnecessary to perform communication among the storage management programs 110 (between the storage management programs 110a and 110b) as in the first embodiment.

In the case in which there is a change in configuration information, such as a change in configuration, detection of a high-load port, or shift from high-load to low-load, the storage management program 110b issues a request for registration change for configuration information to the name management program 114 (S2301).

The processing in S2301 is the same as the processing in FIG. 12, except that the processing procedure in S1203 is different. More specifically, the processing in S2301 is different from the processing in FIG. 12 in that, in the case of S2301, rather than performing the update information inquiry from the storage management program 110a to the storage management program 110b, as in S1203 in FIG. 12, the storage management program 110b refers to the configuration information of the storage subsystem 102.

Note that, in the case of a discovery request from the host computer 101, the name management program 114 performs ordinary processing for the discovery request and responds to the discovery request.

In this way, in the first to the fourth embodiments, the group of logical devices 105, the group of the ports 204, and the host computers 101 are classified in the storage domain 301A such that logic devices and ports belonging to the same storage domain can be combined arbitrarily. Therefore, it becomes unnecessary to perform setting for associating logic devices and ports in a one-to-one correspondence as in the conventional storage subsystem, and complexity in the management of the storage subsystem can be eliminated.

In addition, according to this embodiment, in performing the port allocation processing, ports can be allocated to logic devices dynamically taking into account the load states of the ports. Further, according to this embodiment, in performing the port allocation processing, the ports 204, which have addresses near the host 101 requesting access, can be allocated dynamically. Therefore, according to this embodiment, the utilization rate of the entire system can be improved.

Moreover, in this embodiment, a host computer sends a standard discovery request complying with protocols of iSNS and iSCSI to a management computer to thereby acquire information on a port corresponding to a logic device that is desired to be accessed from the management computer. Consequently, according to this embodiment, in the case in which load distribution processing and failure avoidance processing are performed for an information processing system, to which plural storage subsystems of different manufacturers are connected, it is unnecessary to install a device program for each of the disk array apparatuses of the different manufacturers on a host computer.

Note that the present invention is not limited to the embodiments explained above, and various modifications are possible within the scope of the present invention. For example, in the third and fourth embodiments, the case in which a storage domain is used as a management unit for a storage subsystem has been explained. However, a SAN domain may be used as the management unit for the storage subsystem in addition to the storage domain as in the second embodiment.

In addition, in this embodiment, host computers, logic devices and ports are grouped in storage domains to perform access management.

However, the present invention is not limited to this. For example, it is also possible that only the logic devices and the ports are grouped in the storage domains, and the access management with respect to the logic devices is performed from the host computers. In the case of such a configuration, since it is also unnecessary to associate the ports and the logic devices one to one as in the conventional technique, time and labor at the time of setting for a storage subsystem and a change in the configuration can be reduced.

If the logic devices and the ports are grouped in this way, since optimal ports can be allocated according to the states of the ports, the utilization rate of the entire system can be improved as in the above-mentioned embodiments.

In this way, according to the present invention, plural ports, plural logic devices included in a storage subsystem, and host computers are grouped in one or more storage domains. Then, in accordance with the present invention, a storage domain to which both a host computer, which has sent a discovery request, and a logic device, for which the discovery is requested, belong is selected out of the storage domains in which plural ports, plural logic devices, and the host computers are grouped, and ports belonging to the specified storage domain are selected. Consequently, in accordance with the present invention, simply by grouping the plural ports and the plural logic devices, the ports can be allocated without setting the logic devices and the ports in one-to-one correspondence. In other words, according to the present invention, in the storage subsystem, interface ports can be managed and used easily and efficiently.

Further, according to the present invention, the host computer can acquire information on ports corresponding to a logic device, which is desired to be accessed, from a management computer by sending a standard discovery request complying with the protocols of iSNS and iSCSI to the host computer. Consequently, according to the present invention, even in the case in which load distribution and failure avoidance processing are performed for an information processing system, to which plural storage subsystems of different manufacturers are connected it is unnecessary to install a device program for the storage subsystem of the different manufacturers on a host computer.

I claim:

1. A method for managing a storage subsystem operatively connected to a plurality of host computers and a management computer via a SAN (Storage Area Network), wherein the storage subsystem includes a plurality of logic devices and a plurality of ports via which the plurality of logic devices are accessed by the plurality of host computers, the method comprising:

defining a plurality of storage domains, each of the plurality of storage domains including at least one of the plurality of ports, at least one of the plurality of logic devices, and at least one of the plurality of host computers, to thereby allow each host computer to access a logic device belonging to the same storage domain as the host computer via a port belonging to the same storage domain as the host computer;

obtaining topology information of the SAN;

dividing the SAN into a plurality of SAN domains that are management units according to a security function in the SAN, based on the topology information of the SAN, so that each of the plurality of SAN domains includes at least one of the plurality of host computers and at least one of the plurality of ports, wherein at least two of said plurality of SAN domains belong to the same storage domain;

after defining the plurality of storage domains and dividing the SAN into the plurality of SAN domains, receiving a discovery request for one of the plurality of logic devices from one of the plurality of host computers;

in response to the discovery request, specifying one of the storage domains to which both the requesting one of the plurality of host computers and the requested one of the plurality of logic devices belong, specifying one of the SAN domains to which the requesting one of the plurality of host computers belongs, selecting one of the plurality of ports which belongs to both the specified one of the storage domains and the specified one of the SAN domains, and allocating the selected one of the plurality of ports to the requested one of the plurality of logic devices; and sending information regarding the selected one of the plurality of ports to the requesting one of the plurality of host computers to enable access by the requesting one of the plurality of host computers to the requested one of the plurality of logic devices via the selected one of the plurality of ports, wherein the storage subsystem executes the step of, in the case in which a configuration of the plurality of logic devices and the plurality of ports included in the storage subsystem has been changed, sending configuration change information, which includes data indicating the changed logic devices and ports, to the management computer, wherein in response to receiving the configuration change information, the management computer executes the step of changing the definition of the storage domains in which the plurality of ports, the plurality of logic devices, and the plurality of host computers are defined, using the received configuration change information, wherein the management computer executes the step of periodically acquiring, from the storage subsystem, information indicating a port utilization rate, and wherein, in the step of selecting one of the plurality of ports to be allocated to the requested one of the plurality of logic devices, in the case in which there are a plurality of selectable ports, the management computer selects the one of the plurality of ports with a low utilization rate using the acquired utilization rate.

2. A method according to claim 1,
wherein the storage subsystem executes the step of, at the time of initial setting, sending configuration information, which includes data indicating the plurality of logic devices and the plurality of ports included in the storage subsystem, to the management computer.

3. A method according to claim 1,
wherein the management computer executes the step of periodically acquiring, from the storage subsystem, information indicating whether or not the ports are normal, and
wherein, in the step of selecting one of the plurality of ports to be allocated to the requested one of the plurality of logic devices, in the case in which there are a plurality of selectable ports, the management computer selects one of the plurality of ports with a normal state and based on a number of normal ports, using the acquired information indicating whether or not the ports are normal.

4. A method according to claim 1,
wherein, in the step of selecting one of the plurality of ports to be allocated to the requested one of the plurality of logic devices, in the case where there are a plurality of selectable ports, the management computer selects a port with a network address of the requesting one of the plurality of host computers which is a closest port based on sub-network addresses of the plurality of ports and the requesting one of the plurality of host computers; and
wherein the network address of the requesting one of the host computers is an IP address.

5. A method according to claim 1,
wherein, in the step of dividing the SAN into the SAN domains, the management computer divides the SAN such that the SAN domains are identical with domains in a VLAN.

6. A method according to claim 1,
wherein, in the case in which data indicating that a port is overloaded is included in the acquired configuration change information, the management computer cancels association between a logic device and the overloaded port in a storage domain.

7. A method according to claim 1,
wherein the step of obtaining topology information of the SAN obtains the topology information from a topology management table stored in the management computer;
wherein the step of dividing the SAN into one or more SAN domains is performed based on the topology information stored in the topology management table;
wherein the SAN domains are associated with attributes thereof in a SAN domain management table stored in the management computer, based on the topology information stored in the topology information management table; and
wherein the SAN domains are associated with the plurality of ports in a port management table stored in the management computer, based on the topology information stored in the topology management table.

8. A management computer that manages a storage system operatively connected to the management computer and a plurality of computers via a network, wherein the storage system includes a plurality of logic devices and a plurality of ports via which the plurality of logic devices are accessed by the plurality of host computers, the management computer comprising:

a control unit; and an input/output unit that is connected to the network and the control unit, wherein the plurality of computers and the storage system are connected via a SAN (Storage Area Network), wherein the control unit defines a plurality of storage domains, each of the plurality of storage domains including at least one of the plurality of ports, at least one of the plurality of logic devices, and at least one of the plurality of computers, to thereby allow each computer to access a logic device belonging to the same storage domain as the computer via a port belonging to the same storage domain as the computer; obtains topology information of the SAN; divides the SAN into a plurality of SAN domains that are management units according to a security function in the SAN, based on the topology information of the SAN, so that each of the plurality of SAN domains includes at least one of the plurality of computers and at least one of the plurality of ports, wherein at least two of said plurality of SAN domains belong to the same storage domain; after defining the plurality of storage domains and dividing the SAN into the plurality of SAN domains, receives a discovery request for one of the plurality of logic devices from one of the plurality of computers; in response to the discovery request, specifies one of the storage domains to which both the requesting one of the plurality of computers and the requested one of the plurality of logic devices belong, specifies one of the SAN domains to which the requesting one of the plurality of computers belongs, selects one of the plurality of ports belonging to both the specified one of the storage domains and the specified one of the SAN domains, and allocates the selected one of the plurality of ports to the requested one of the plurality of logic devices; and sends information regarding the selected one of the plurality of ports to the requesting one of the plurality of computers to enable access by the requesting one of the plurality of computers to the requested one of the plurality of logic devices via the selected one of the plurality of ports, wherein the control unit periodically acquires, from the storage system via the input/output unit, information indicating a port utilization rate, and wherein, in the case in which there are a plurality of selectable ports, the control unit selects, as the selected one of the plurality of ports, a port with a low utilization rate using the acquired utilization rate.

9. A management computer according to claim 8, wherein the control unit periodically acquires, from the storage system, information indicating whether or not the ports are normal, and wherein, in the case in which there are a plurality of selectable ports, the control unit selects, as the selected one of the plurality of ports, a port with a normal state and based on a number of normal ports, using the acquired information indicating whether the ports are normal.

10. A management computer according to claim 8, wherein in selecting one of the plurality of ports to be allocated to the requested one of the plurality of logic devices, in the case in which there are a plurality of selectable ports, the control unit selects a port with a network address of the requesting one of the plurality of computers closest to a network address of the requesting one of the plurality of computers based on sub-network addresses of the plurality of ports and the requesting one of the plurality of computers.

11. A management computer according to claim 8, wherein the control unit divides the SAN such that the SAN domains are identical with domains of a VLAN.

12. A management computer according to claim 8, wherein the topology information of the SAN is obtained from a topology management table stored in the management computer;

wherein the SAN is divided into one or more SAN domains based on the topology information stored in the topology management table;

wherein the SAN domains are associated with attributes thereof in a SAN domain management table stored in the management computer, based on the topology information stored in the topology information management table; and wherein the SAN domains are associated with the plurality of ports in a port management table stored in the management computer, based on the topology information stored in the topology management table.

* * * * *

UNITED STATES PATENT AND TRADEMARK OFFICE
CERTIFICATE OF CORRECTION

| | | |
|---|---|---|
| PATENT NO. | : 7,548,924 B2 | Page 1 of 1 |
| APPLICATION NO. | : 10/873271 | |
| DATED | : June 16, 2009 | |
| INVENTOR(S) | : Watanabe | |

It is certified that error appears in the above-identified patent and that said Letters Patent is hereby corrected as shown below:

On the cover page, item:

(45)   Date of Patent:      ~~* Jun.~~ Jun. 16, 2009

(*)    Notice:       Subject to any disclaimer, the term of this patent is extended or adjusted Under 36 U.S.C. 154(b) by 158 days.

~~This patent is subject to a terminal disclaimer.~~

Signed and Sealed this

First Day of September, 2009

David J. Kappos
*Director of the United States Patent and Trademark Office*